(12) United States Patent
Kim et al.

(10) Patent No.: US 11,044,475 B2
(45) Date of Patent: Jun. 22, 2021

(54) METHOD AND APPARATUS FOR ENCODING/DECODING IMAGE

(71) Applicant: INDUSTRY-UNIVERSITY COOPERATION FOUNDATION HANYANG UNIVERSITY, Seoul (KR)

(72) Inventors: Ki Baek Kim, Seoul (KR); Je Chang Jeong, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 0 days.

(21) Appl. No.: 16/631,325

(22) PCT Filed: Jul. 12, 2018

(86) PCT No.: PCT/KR2018/007924
§ 371 (c)(1),
(2) Date: Jan. 15, 2020

(87) PCT Pub. No.: WO2019/017651
PCT Pub. Date: Jan. 24, 2019

(65) Prior Publication Data
US 2020/0213590 A1    Jul. 2, 2020

(30) Foreign Application Priority Data

Jul. 17, 2017  (KR) .................. 10-2017-0090633

(51) Int. Cl.
*H04N 19/119*    (2014.01)
*H04N 19/176*    (2014.01)

(52) U.S. Cl.
CPC ......... *H04N 19/119* (2014.11); *H04N 19/176* (2014.11)

(58) Field of Classification Search
CPC .......................... H04N 19/119; H04N 19/176
See application file for complete search history.

(56) References Cited

U.S. PATENT DOCUMENTS 8,223,843 B2    7/2012    Lee et al.
8,446,959 B2    5/2013    Lee et al.
(Continued)

FOREIGN PATENT DOCUMENTS

EP          3059708 A1       8/2016
KR    10-2010-0095992 A      9/2010
(Continued)

OTHER PUBLICATIONS

International Search Report for PCT/KR2018/007924 dated Oct. 11, 2018 [PCT/ISA/210].
(Continued)

*Primary Examiner* — Y Lee
(74) *Attorney, Agent, or Firm* — Sughrue Mion, PLLC

(57) ABSTRACT

An image encoding method configuring block division information and size information of a boundary block which is located at a boundary of an image and is smaller than a size of a basic encoding block, on the basis of size information of a picture and size information of the basic encoding block; dividing the boundary block into at least one encoding block, on the basis of the size information of the basic encoding block and the size information and the block division information of the boundary block; and encoding the at least one divided encoding block.

3 Claims, 19 Drawing Sheets

(56) References Cited

U.S. PATENT DOCUMENTS

| | | |
|---|---|---|
| 8,780,993 B2 | 7/2014 | Lee et al. |
| 8,885,723 B2 | 11/2014 | Lee et al. |
| 8,885,724 B2 | 11/2014 | Lee et al. |
| 8,885,725 B2 | 11/2014 | Lee et al. |
| 8,938,006 B2 | 1/2015 | Lee et al. |
| 9,025,667 B2 | 5/2015 | Lee et al. |
| 9,294,780 B2 | 3/2016 | Lee et al. |
| 9,843,804 B2 | 12/2017 | An et al. |
| 10,212,444 B2 | 2/2019 | Li et al. |
| 10,375,393 B2 | 8/2019 | An et al. |
| 10,448,042 B2 | 10/2019 | Lee et al. |
| 10,506,231 B2 | 12/2019 | An et al. |
| 10,506,246 B2 | 12/2019 | Li et al. |
| 2011/0134998 A1 | 6/2011 | Lee et al. |
| 2012/0082216 A1 | 4/2012 | Wang et al. |
| 2012/0082238 A1 | 4/2012 | Panusopone et al. |
| 2012/0114043 A1 | 5/2012 | Lee et al. |
| 2012/0128070 A1 | 5/2012 | Kim et al. |
| 2012/0207211 A1 | 8/2012 | Song et al. |
| 2012/0236944 A1 | 9/2012 | Lee et al. |
| 2012/0269274 A1 | 10/2012 | Kim et al. |
| 2013/0251035 A1 | 9/2013 | Lee et al. |
| 2014/0192874 A1 | 7/2014 | Lee et al. |
| 2014/0192875 A1 | 7/2014 | Lee et al. |
| 2014/0192890 A1 | 7/2014 | Lee et al. |
| 2014/0286426 A1 | 9/2014 | Lee et al. |
| 2015/0215636 A1 | 7/2015 | Lee et al. |
| 2015/0350566 A1 | 12/2015 | Hu et al. |
| 2016/0156924 A1 | 6/2016 | Lee et al. |
| 2016/0156926 A1 | 6/2016 | Hashimoto et al. |
| 2016/0381357 A1 | 12/2016 | Kim et al. |
| 2017/0208336 A1 | 7/2017 | Li et al. |
| 2017/0272750 A1 | 9/2017 | An et al. |
| 2018/0063528 A1 | 3/2018 | An et al. |
| 2018/0199034 A1 | 7/2018 | Nam et al. |
| 2019/0116373 A1 | 4/2019 | Li et al. |
| 2019/0313096 A1 | 10/2019 | An et al. |

FOREIGN PATENT DOCUMENTS

| | | |
|---|---|---|
| KR | 10-2011-0036519 A | 4/2011 |
| KR | 10-1484280 B1 | 1/2015 |
| KR | 10-2016-0034903 A | 3/2016 |
| KR | 10-2017-0077203 A | 7/2017 |
| KR | 10-2018-0102569 A | 9/2018 |
| WO | 2016/204531 A1 | 12/2016 |
| WO | 2017/086738 A1 | 5/2017 |
| WO | 2017/222331 A1 | 12/2017 |

OTHER PUBLICATIONS

Communication dated Nov. 17, 2020, from the European Patent office in application No. 18834693.6.

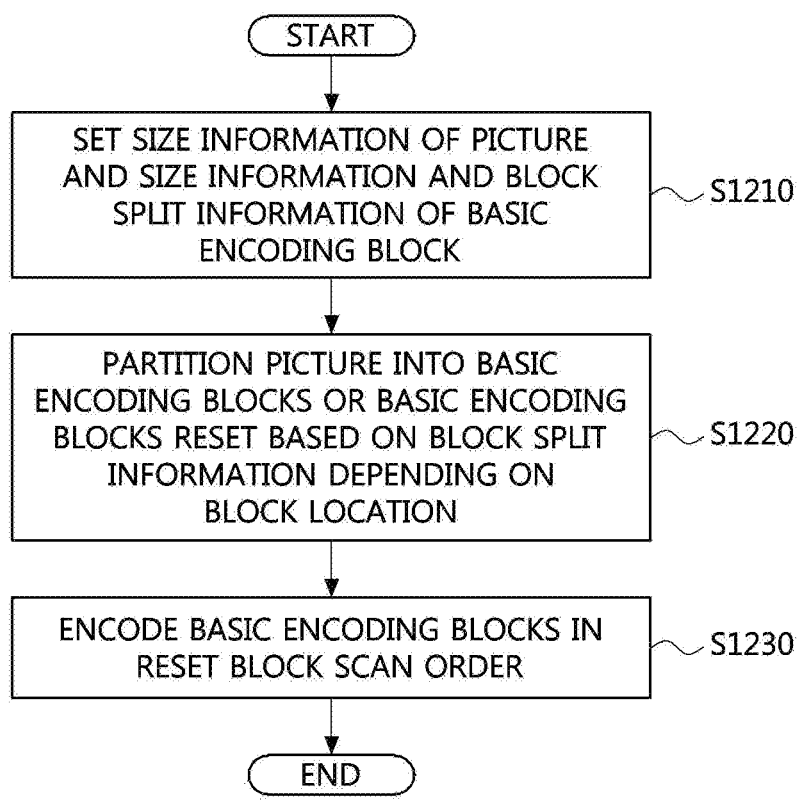

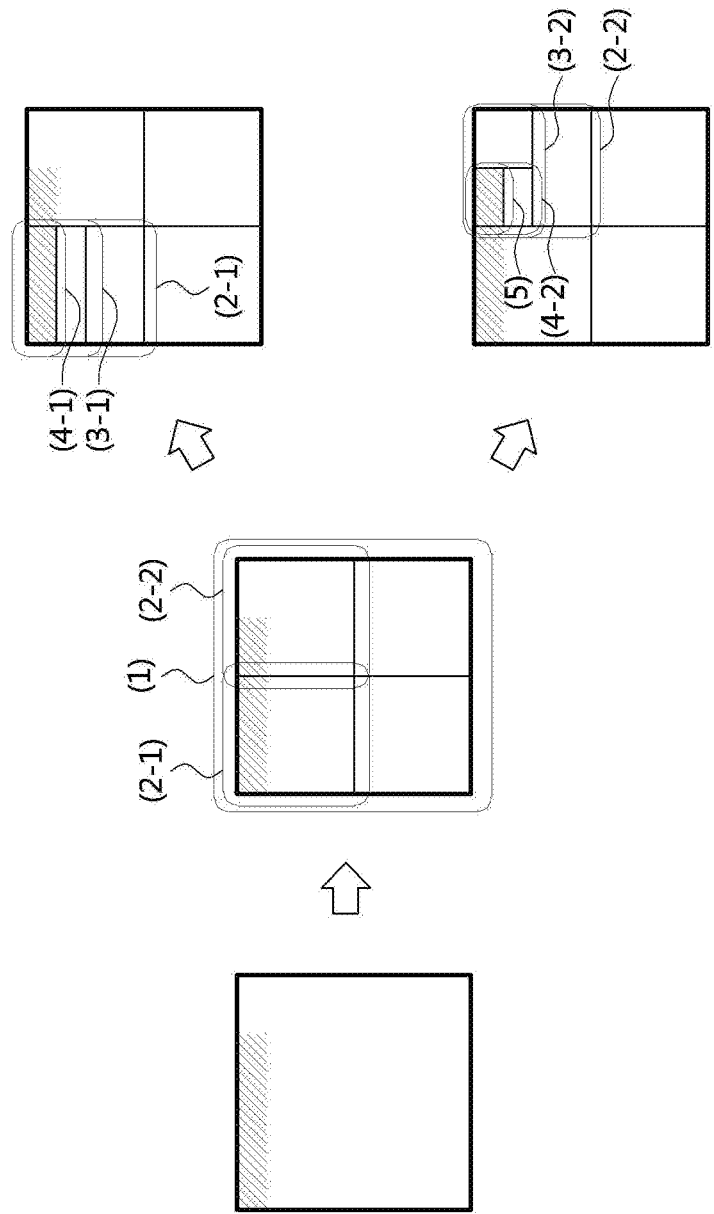

METHOD AND APPARATUS FOR ENCODING/DECODING IMAGE

CROSS REFERENCE TO RELATED APPLICATIONS

This application is a National Stage of International Application No. PCT/KR2018/007924 filed Jul. 12, 2018, claiming priority based on Korean Patent Application No. 10-2017-0090633 filed Jul. 17, 2017.

TECHNICAL FIELD

Example embodiments of the present invention relate to a method of encoding/decoding an image having a size that is not a multiple of the size of a basic encoding block, and more particularly, to a method and apparatus for encoding/decoding an image having a size that is not a multiple of the size of a basic encoding block by expanding the image or adjusting the encoding block.

RELATED ART

With the spread of the Internet and mobile terminals and the development of information and communication technology, the use of multimedia data is increasing rapidly. Therefore, in order to perform various services or tasks through image prediction in various systems, a need for improvement of performance and efficiency of an image processing system has increased considerably, but a research and development result that can respond to the need has heretofore been insufficient.

As described above, in an image encoding and decoding method and apparatus of the related art, there is a demand for improvement of performance in image processing, and particularly, in image encoding or image decoding.

DISCLOSURE

Technical Problem

Example embodiments of the present invention provide a method for encoding/decoding an image having a size that is not a multiple of the size of a basic encoding block.

Example embodiments of the present invention also provide an apparatus for encoding/decoding an image having a size that is not a multiple of the size of a basic encoding block.

Technical Solution

In some example embodiments, an image encoding method includes: setting size information and block split information of a boundary block that is located on a boundary of an image and smaller than a basic encoding block on the basis of size information of a picture and size information of the basic encoding block; splitting the boundary block into at least one encoding block on the basis of the size information of the basic encoding block and the size information and the block split information of the boundary block; and encoding the at least one encoding block.

Here, the image encoding method further includes: expanding a size of the picture on the basis of the size information of the boundary block and the size information of the basic encoding block; and adjusting the size information of the boundary block on the basis of the expanded size of the picture.

Here, the splitting of the boundary block into the at least one encoding block includes: adjusting a size of the basic encoding block according to the block split information; and splitting the boundary block into at least one encoding block on the basis of the size information of the basic encoding block, the size information of the boundary block, and information regarding the adjusted size of the basic encoding block.

Advantageous Effects

According to the present invention, when the size of an image is not a multiple of the size of a basic encoding block, it is possible to provide uniformity of encoding by expanding the image such that the size of the image is a multiple of the size of the basic encoding block.

According to the present invention, when the size of an image is not a multiple of the size of a basic encoding block, it is possible to provide high efficiency encoding by adjusting the size of the basic encoding block.

BRIEF DESCRIPTION OF DRAWINGS

FIG. 12 is a flowchart showing a method of encoding an image by adjusting a basic encoding block according to an embodiment of the present invention.

FIGS. 17A to 17F show a first example diagram illustrating an adaptive image data processing method using a plurality of split methods according to an embodiment of the present invention.

DESCRIPTION OF EXAMPLE EMBODIMENTS

Figure 1:
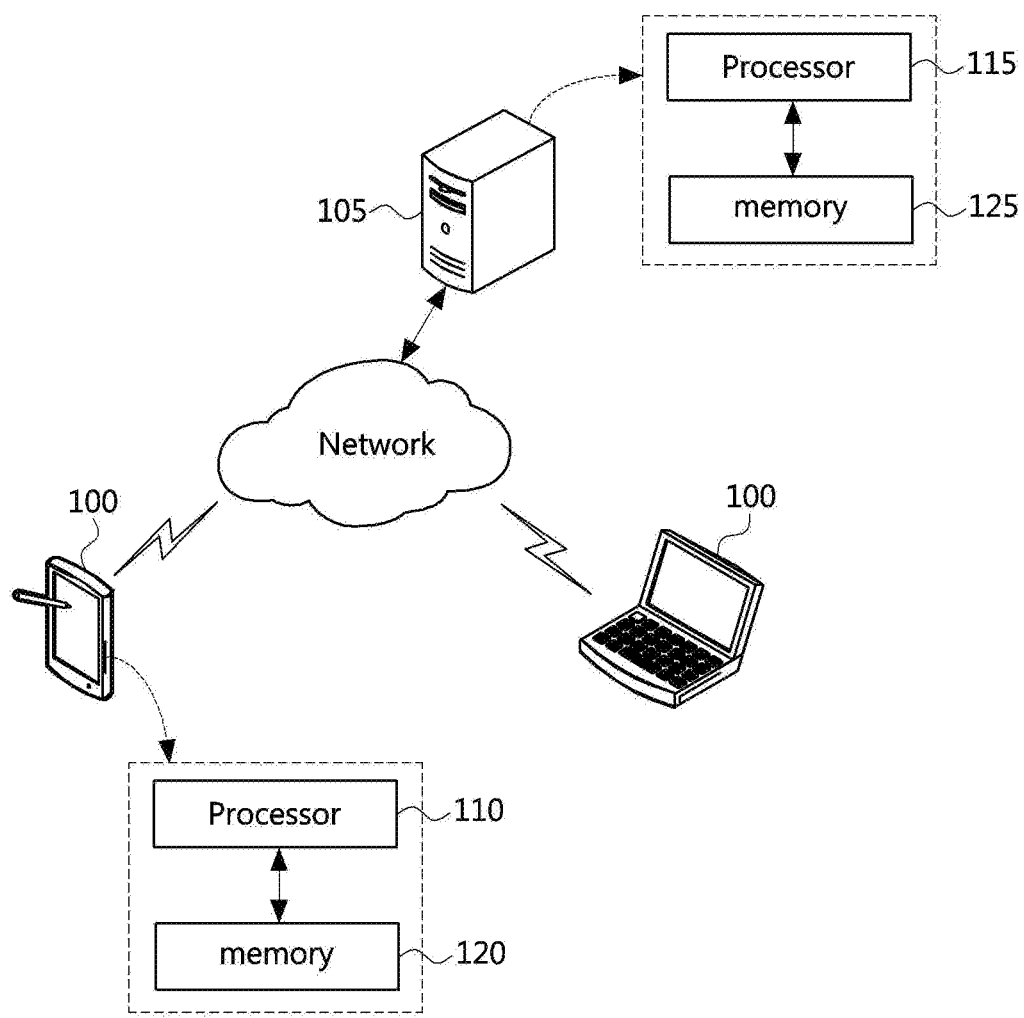
FIG. 1 is a conceptual view of an image encoding and decoding system according to an embodiment of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Generally, an image may be composed of a series of still images. The still images may be classified in units of a group of pictures (GOP), and each still image may be referred to as a picture or a frame. As a higher concept, units such as a GOP and a sequence may exist, and also each picture may be split into predetermined regions such as slices, tiles, blocks, and the like. Also, one GOP may include units such as Picture I, Picture P, and Picture B. Picture I may refer to a picture that is autonomously encoded/decoded without using a reference picture, and Picture P and Picture B may refer to a picture that is encoded/decoded by performing a process such as motion estimation and motion compensation using a reference picture. Generally, Picture P may use Picture I and Picture B as reference pictures, and Picture B may use Picture I and Picture P as reference pictures. However, the above definitions may also be changed by settings of encoding/decoding.

Here, a picture referred to in encoding/decoding is called a reference picture, and a block or pixel referred to in encoding/decoding is called a reference block or a reference pixel. Also, reference data may include frequency-domain coefficients and various types of encoding/decoding information generated and determined during an encoding/decoding process, as well as spatial-domain pixel values.

The minimum unit of the image may be a pixel, and the number of bits used to represent one pixel is called a bit depth. Generally, the bit depth may be eight bits, and another bit depth may be supported depending on the encoding settings. At least one bit depth may be supported depending on a color space. Also, at least one color space may be included according to an image color format. One or more pictures having the same size or one or more pictures having different sizes may be included according to a color format. For example, YCbCr 4:2:0 may be composed of one luminance component (Y in this example) and two chrominance components (Cb/Cr in this example). At this time, the ratio of the luminance component and the chrominance components may be 1:2 in length and width. As another example, YCbCr 4:4:4 may have the same ratio in length and width. As the above example, when one or more color spaces are included, a picture may be split into the color spaces.

The present invention will be described on the basis of any color space (Y in this example) of any color format (YCbCr in this example), and this description will be applied to another color space (Cb and Cr in this example) of the color format in the same or similar manner (settings dependent on a specific color space). However, a partial difference (settings independent of a specific color space) may be given to each color space. That is, the settings dependent on each color space may refer to settings proportional to or dependent on the component ratio (e.g., 4:2:0, 4:2:2, or 4:4:4), and the setting independent of each color space may refer to settings of only a corresponding color space, independently from or regardless of the component ratio. In the present invention, some elements may have independent settings or dependent settings depending on the encoder/decoder.

Setting information or syntax elements needed during an image encoding process may be determined at a level of units such as a video, a sequence, a picture, a slice, a tile, a block, and the like. The units include a video parameter set (VPS), a sequence parameter set (SPS), a picture parameter set (PPS), a slice header, a tile header, and a block header. An encoder may add the units to a bitstream and send the bitstream to a decoder. The decoder may parse the bitstream at the same level, restore the setting information sent by the encoder, and use the setting information in an image decoding process. Each parameter set has a unique ID value, and a lower parameter set may have an ID value of an upper parameter set to be referred to. For example, a lower parameter set may refer to information of an upper parameter set having a corresponding ID value among one or more upper parameter sets. Among various examples of the above-described units, when any one unit includes one or more different units, the any one unit may be referred to as an upper unit, and the included units may be referred to as a lower unit.

Setting information having occurred in such a unit may include settings independent of each unit or settings dependent on a previous, following, or upper unit. Here, it will be understood that the dependent settings indicate setting information of a corresponding unit using flag information corresponding to settings of the previous, following, or upper unit (e.g., 1-bit flag; 1 indicates Follow, and 0 indicates Do Not Follow). In the present invention, the setting information will be described focusing on an example of the independent settings. However, an example may also be included in which a relation dependent on the setting information of the previous, following, or upper unit of the current unit is added to, or substituted for, the independent settings.

Generally, image encoding/decoding may be performed according to an input size, but may be performed through size adjustment. For example, a hierarchical coding scheme for supporting spatial, temporal, and image-quality-related scalability may allow adjusting the entire resolution such as image expansion and reduction and also may allow performing partial image expansion and reduction. Such information may be switched by assigning selection information in the above-described unit such as VPS, SPS, PPS, and Slice Header. In this case, a vertical relation between the units may be set as VPS>SPS>PPS>Slice header.

Preferred embodiments of the present invention will be described below in more detail with reference to the accompanying drawings.

FIG. 1 is a conceptual view of an image encoding and decoding system according to an embodiment of the present invention.

Referring to FIG. 1, an image encoding apparatus 105 and an image decoding apparatus 100 may be a user terminal such as a personal computer (PC), a notebook computer, a personal digital assistant (PDA), a portable multimedia player (PMP), a PlayStation Portable (PSP), a wireless communication terminal, a smart phone, and a TV or a server terminal such as an application server and a service server, and may include a variety of apparatuses having a communication device, such as a communication modem, for communicating with various devices or wired/wireless communication networks, a memory 120 or 125 for storing various programs and data for performing inter- or intra-prediction to encode or decode an image, or a processor 110 or 115 for executing the programs to perform calculation and control, and so on.

In addition, an image encoded into a bitstream by the image encoding apparatus 105 is transmitted to the image decoding apparatus 100 in real time or in non-real time through a wired/wireless communication network such as the Internet, a local area network (LAN), a wireless LAN, a WiBro network, or a mobile communication network and through a variety of communication interfaces such as a cable, a universal serial bus (USB), or the like. The bitstream is decoded by the image decoding apparatus 100 so that the image may be restored and replayed. Also, the image encoded into the bitstream by the image encoding apparatus 105 may be transferred from the image encoding apparatus 105 to the image decoding apparatus 100 through a computer readable recording medium.

The above-described image encoding apparatus and decoding apparatus may be separate apparatuses, but may be provided as a single image encoding/decoding apparatus according to the implementation. In this case, some elements of the image encoding apparatus may be substantially the same as those of the image decoding apparatus and may be implemented to include at least the same structures or perform the same functions.

Therefore, in the following detailed description of technical elements and their working principles, a redundant description of the corresponding technical elements will be omitted. Also, the image decoding apparatus corresponds to a computing apparatus that applies an image encoding method performed by the image encoding apparatus to a decoding process, and thus the following description will focus on the image encoding apparatus.

The computer apparatus may include a memory configured to store a program or a software mode for implementing an image encoding method and/or an image decoding method and a processor connected to the memory to execute the program. Here, the image encoding apparatus may also be referred to as an encoder, and the image decoding apparatus may also be referred to as a decoder.

Figure 2:
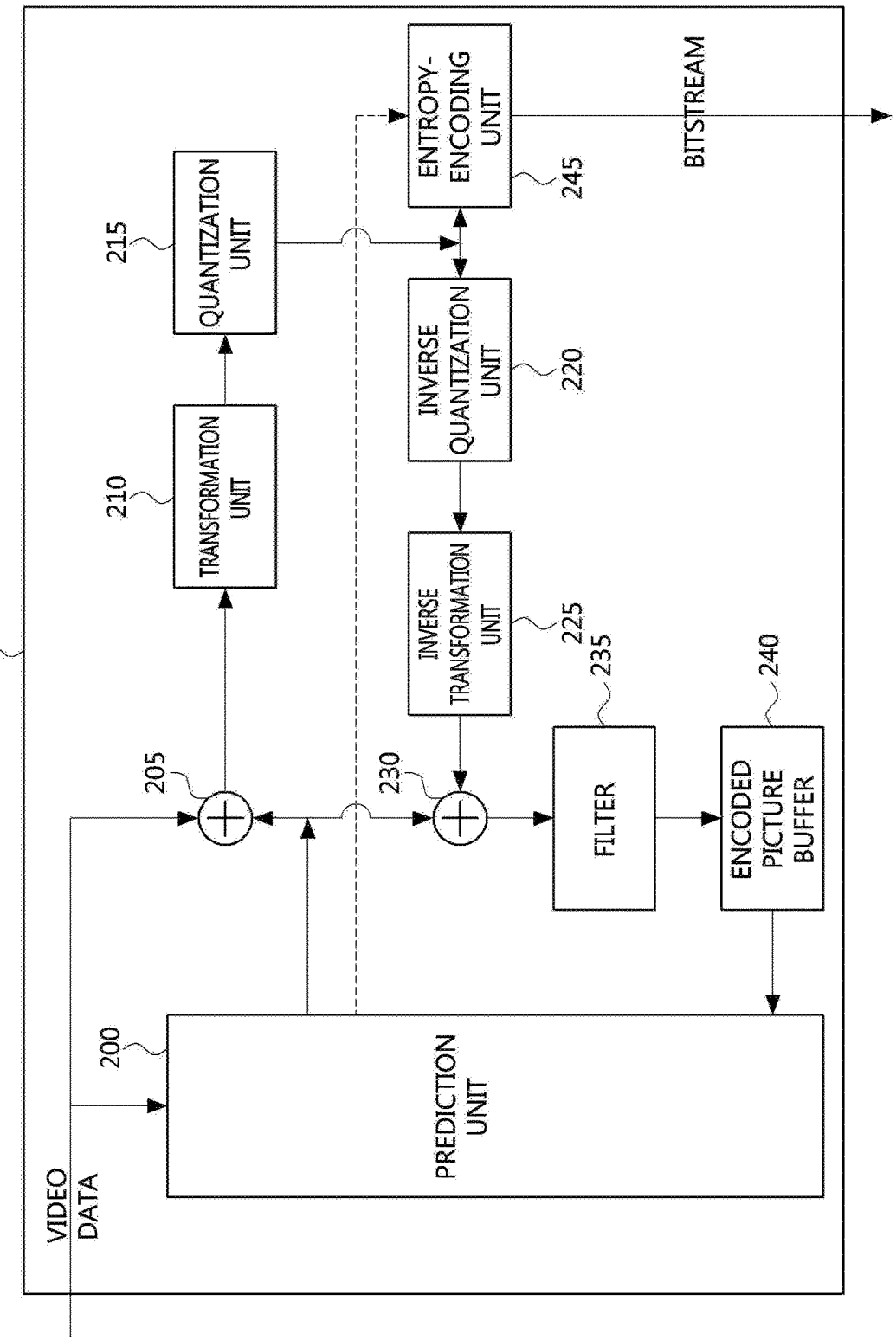
FIG. 2 is a block diagram of an image encoding apparatus according to an embodiment of the present invention.

FIG. 2 is a block diagram of an image encoding apparatus according to an embodiment of the present invention.

Referring to FIG. 2, the image encoding apparatus 20 may include a prediction unit 200, a subtractor unit 205, a transformation unit 210, a quantization unit 215, an inverse quantization unit 220, an inverse transformation unit 225, an adder unit 230, a filter unit 235, an encoded picture buffer 240, and an entropy-encoding unit 245.

The prediction unit 200 may be implemented using a prediction module, which is a kind of software module, and may generate a prediction block to perform intra-prediction or inter-prediction on a block to be encoded. The prediction unit 200 may predict a current block to be encoded in an image to generate a prediction block. In other words, the prediction unit 200 may predict a pixel value of a pixel of a current block to be encoded in an image through intra-prediction or inter-prediction to generate a prediction block having a predicted pixel value of the pixel. Also, the prediction unit 200 may transfer information needed to generate the prediction block, such as information regarding a prediction mode such as an inter-prediction mode or an intra-prediction mode, to an encoding unit so that the encoding unit may encode the information regarding the prediction mode. In this case, a processing unit for performing prediction, a prediction method, and a processing unit for determining details may be determined through encoding/decoding settings. For example, a prediction method, a prediction mode, and the like may be determined by a prediction unit, and prediction may be performed by a transform unit.

An intra-prediction unit may have a directional prediction mode such as a horizontal mode, a vertical mode, and the like used depending on a prediction direction, and a non-directional prediction mode such as DC and Planar using methods such as averaging and interpolation of a reference pixel. An intra-prediction mode candidate group may be configured through the directional and non-directional modes. One candidate may be used, as the candidate group, among various candidates such as 35 prediction modes (33 directional modes+2 non-directional modes), 67 prediction modes (65 directional modes+2 non-directional modes), or 131 prediction modes (129 directional modes+2 non-directional modes).

The intra-prediction unit may include a reference pixel configuration unit, a reference pixel filter unit, a reference pixel interpolation unit, a prediction mode determination unit, a prediction block generation unit, and a prediction mode encoding unit. The reference pixel configuration unit may configure, as a reference pixel for intra-prediction, a pixel that belongs to a block adjacent to a current block and is placed adjacent to the current block. Depending on encoding settings, the reference pixel configuration unit may configure the most adjacent reference pixel line, another adjacent reference pixel line, or a plurality of reference pixel lines as a reference pixel. When some of the reference pixels cannot be used, a reference pixel may be generated using available reference pixels. When none of the reference pixels can be used, a reference pixel may be generated using a predetermined value (e.g., a median of a range of pixels values represented by a bit depth).

The reference pixel filter unit of the intra-prediction unit may filter the reference pixel in order to reduce residual deterioration during an encoding process. In this case, a filter used for the filtering may be a low-pass filter, such as a 3-tap filter [¼, ½, ¼] and a 5-tap filter [2/16, 3/16, 6/16, 3/16, 2/16]. Depending on the encoding information (e.g., a block size, a block form, a prediction mode, etc.), whether to perform filtering and the type of filtering may be determined.

The reference pixel interpolation unit of the intra-prediction unit may generate a decimal fraction pixel through a linear interpolation process for the reference pixel according to the prediction mode. An interpolation filter to be applied may be determined according to the encoding information. In this case, the interpolation filter may include a 4-tap Cubic filter, a 4-tap Gaussian filter, a 6-tap Wiener filter, an 8-tap Kalman filter, and the like. Generally, the interpolation is performed separately from the process of performing the low-pass filtering. However, the filters applied to the two processes may be integrated into a single filter, and the single filter may be used to perform the filtering process.

The prediction mode determination unit of the intra-prediction unit may select at least one optimal prediction mode from the prediction mode candidate group in consideration of an encoding cost. The predication block generation unit may generate a prediction block using the selected prediction mode. The prediction mode encoding unit may encode the optimal prediction mode on the basis of a predicted value. In this case, the prediction information may be adaptively encoded depending on whether the predicted value is correct or incorrect.

The intra-prediction unit may regard the predicted value as Most Probable Mode (MPM) and may configure some of the modes belonging to the prediction mode candidate group as an MPM candidate group. The MPM candidate group may include predetermined prediction modes (e.g., DC, Planar, vertical, horizontal, diagonal modes, etc.) or prediction modes of spatially adjacent blocks (e.g., left, upper, upper left, upper right, and lower left blocks). Also, the intra-prediction unit may configure, as the MPM candidate group, a mode induced from the modes included in the MPM candidate group.

The prediction modes may have priorities to configure the MPM candidate group. The order in which the prediction modes are included in the MPM candidate group may be determined. When the number of prediction modes belonging to the MPM candidate group (which is determined according to the number of prediction mode candidate groups) is filled according to the priorities, the configuration of the MPM candidate group may be completed. In this case, the priorities may be determined in the order of the prediction modes of spatially adjacent blocks, the predetermined prediction modes, and the modes induced from the prediction modes included in the MPM candidate group, but may be determined according to other modifications.

For example, the spatially adjacent blocks may be included in the candidate group in the order of the left block, the upper block, the lower left block, the upper right block, and upper left block. The predetermined prediction modes may be included in the candidate group in the order of DC mode, Planar mode, vertical mode, and horizontal mode. Modes acquired by adding+1, −1, or the like to the pre-included modes may be included in the candidate group. Thus, a total of six modes may constitute the candidate group. Alternatively, a total of seven modes may constitute the candidate group by sequentially including the left block, the upper block, the DC mode, the Planar mode, the lower left block, the upper right block, the upper left block, (the left block+1), (the left block−1), and (the upper block+1).

Depending on a motion prediction method performed by the inter-prediction unit, there may be a movement motion model and a non-movement motion model. The movement motion model may perform prediction in consideration of only parallel movement, and the non-movement motion model may perform prediction in consideration of motions such as rotation, perspective, and zoom in/out as well as parallel movement. When unidirectional prediction is assumed, the movement motion model may need one motion vector, and the non-movement motion model may need one or more motion vectors. Each of the motion vectors of the non-movement motion model may be information applied to a predetermined position of the current block, such as an upper left vertex and an upper right vertex of the current block, and the position of a region to be predicted in the current block may be acquired through a corresponding motion vector in units of a pixel or a sub-block. For the inter-prediction unit, some processes, which will be described below, may be applied in common, and other processes may be applied individually.

The inter-prediction unit may include a reference picture configuration unit, a motion estimation unit, a motion compensation unit, a motion information determination unit, and a motion information encoding unit. The reference picture configuration unit may add an encoded picture before or after the current picture to a reference picture list L0 or L1. A prediction block may be acquired from a reference picture included in the reference picture list. Depending on the encoding settings, the current image may also be configured as the reference picture and added to at least one of the reference picture lists.

The reference picture configuration unit of the inter-prediction unit may include a reference picture interpolation unit and may perform an interpolation process for a decimal fraction pixel according to interpolation precision. For example, an 8-tap discrete cosine transform (DCT)-based interpolation filter may be applied to luminance components, and a 4-tap DCT-based interpolation filter may be applied to chrominance components.

The motion estimation unit of the inter-prediction unit performs a process of searching for a block having a higher correlation with the current block through the reference picture. In this case, various methods such as a full search-based block matching algorithm (FBMA) and a tree step search (TSS) may be used. The motion compensation unit performs a process of acquiring a prediction block through a motion estimation process.

The motion information determination unit of the inter-prediction unit may perform a process of selecting optimal motion information of the current block, and the motion information may be encoded by a motion information encoding mode such as a skip mode, a merge mode, and a competition mode. The modes may be configured by combining modes supported depending on the motion models, and may include, for example, a skip mode (movement), a skip mode (non-movement), a merge mode (movement), a merge mode (non-movement), a competition mode (movement), and a competition mode (non-movement). Some of the modes may be included in the candidate group depending on the encoding settings.

In the motion information encoding mode, a predicted value of the motion information (a motion vector, a reference picture, a predicted direction, etc.) of the current block may be acquired in at least one candidate bock. When two or more candidate blocks are supported, optimal candidate selection information may be generated. In the skip mode (with no residual signal) and the merge mode (with a residual signal), the predicted value to may be used as the motion information of the current block. In the competition mode, information regarding a difference between the predicted value and the motion information of the current block may be generated.

A candidate group for predicted values of the motion information of the current block may be adaptive according to the motion information encoding mode and may have various configurations. The motion information regarding blocks (e.g., left, upper, upper left, upper right, lower left blocks, etc.) spatially adjacent to the current block may be included in the candidate group, and the motion information regarding blocks (e.g., left, right, upper, lower, upper left, upper right, lower left, and lower right blocks including a block (at the center) in another image corresponding to the current block) temporarily adjacent to the current block may be included in the candidate group. Hybrid motion information of spatial candidates and temporal candidates (for example, information acquired as an average or a median through the motion block of spatially adjacent blocks and the motion block of temporarily adjacent blocks; the motion information may be acquired in units of the current block or a sub-block of the current block) may be included in the candidate group.

There may be priorities for configuring a candidate group of the predicted values of the motion information. The order in which the motion information is included in the predicted-value candidate group may be determined. When the number of pieces of the motion information of the candidate group (which is determined according to the motion information encoding mode) is filled according to the priorities, the configuration of the candidate group may be completed. In this case, the priorities may be determined in the order of motion information of spatially adjacent blocks, motion information of temporarily adjacent information, and hybrid motion information of spatial candidates and temporal candidates, but may be determined according to its modification.

For example, the spatially adjacent blocks may be included in the candidate group in the order of left, upper, upper right, lower left, and upper left blocks, and the temporarily adjacent blocks may be included in the order of lower right, middle, right, and lower blocks.

The subtractor unit 205 may subtract the prediction block from the current block to generate a residual block. In other words, the subtractor unit 205 may calculate a difference between a pixel value of each pixel of the current block to be encoded and a predicted pixel value of each pixel of the prediction block generated through the prediction unit to generate a residual block, which is a block-type residual signal. Also, the subtractor unit 205 may generate the residual block according to a unit other than a block unit acquired through a block split unit to be described below.

The transformation unit 210 transforms the residual block into the frequency domain to transform each pixel value of the residual block into a frequency coefficient. Here, the transformation unit 210 may transform a residual signal into the frequency domain by using various transformation techniques for transforming a picture signal on the spatial axis into the frequency axis, such as Hadamard Transform, DCT-Based Transform, Discrete sine transform (DST)-Based Transform, and Karhuhen-Loeve Transform (KTL)-Based Transform. The residual signal converted in the frequency domain is a frequency coefficient. The transformation may be made by a one-dimensional transformation matrix. Each transformation matrix may be adaptively used by a horizontal unit or a vertical unit. For example, for the intra-prediction, when the prediction mode is horizontal, the DCT-based transformation matrix may be used in a vertical direction, and the DST-based transformation matrix may be used in a horizontal direction. When the prediction mode is vertical, the DCT-based transformation matrix may be used in a horizontal direction, and the DST-based transformation matrix may be used in a vertical direction.

The quantization unit 215 quantizes a residual block having a frequency coefficient obtained by the transformation into the frequency domain by the transformation unit 210. Here, the quantization unit 215 may quantize the transformed residual block by using a dead zone uniform threshold quantization, a quantization weighted matrix, or other improved to quantization methods. One or more quantization methods may be provided as candidates and may be determined by an encoding mode, prediction mode information, and the like.

The inverse quantization unit 220 inversely quantizes the residual block quantized by the quantization unit 215. That is, the inverse quantization unit 220 inversely quantizes a quantization frequency coefficient string to generate a residual block having a frequency coefficient.

The inverse transformation unit 225 inversely transforms the residual block that is inversely quantized by the inverse quantization unit 220. That is, the inverse transformation unit 225 inversely transforms frequency coefficients of the inversely quantized residual block to generate a residual block having a pixel value, i.e., a restored residual block. Here, the inverse transformation unit 225 may perform inverse transformation by, in reverse, using the transformation scheme used by the transformation unit 210.

The adder unit 230 adds the residual block restored by the inverse transformation unit 225 to the prediction block predicted by the prediction unit 200 to restore the current block. The restored current block may be stored in the encoded picture buffer 240 as a reference picture (or a reference block) and may be used as the reference picture when a block after the current block or another block or picture subsequent to the current block is encoded.

The filter unit 235 may perform a post-processing filtering process of one or more of a deblocking filter, a sample adaptive offset (SAO), an adaptive loop filter (ALF), and the like. The deblocking filter may remove block distortion generated at a boundary between blocks from the restored picture. The ALF may perform filtering on the basis of a value obtained by comparing an original image to an image restored after the block is filtered through the deblocking filter. The SAO may restore an offset difference between the original image and the residual block to which the deblocking filter is applied, in units of a pixel. Such a post-processing filter may be applied to the restored picture or block.

The encoded picture buffer 240 may store the block or picture restored through the filter unit 235. The restored block or picture stored in the encoded picture buffer 240 may be provided to the prediction unit 200, which is configured to perform intra-prediction or inter-prediction.

The entropy-encoding unit 245 scans a generated quantization frequency coefficient string according to various scan schemes to generate a quantization coefficient string, encodes the generated quantization coefficient string, and outputs the encoded string. A pattern for the scanning may be set as one of various patterns such as a zigzag pattern, a diagonal pattern, a raster pattern, etc. Also, the entropy-encoding unit 245 may generate encoding data including encoding information delivered from each element and may output the encoding data in a bitstream.

Figure 3:
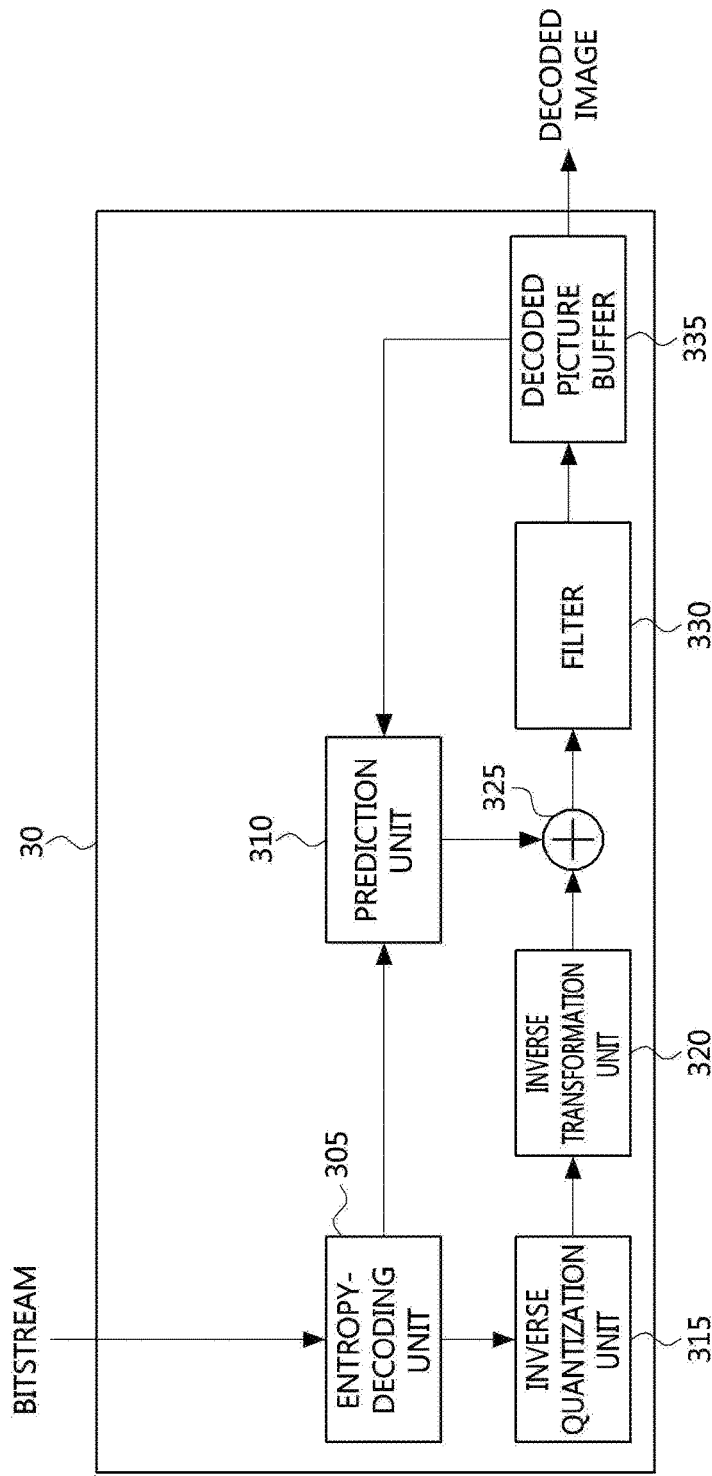
FIG. 3 is a block diagram of an image decoding apparatus according to an embodiment of the present invention.

FIG. 3 is a block diagram of an image decoding apparatus according to an embodiment of the present invention.

Referring to FIG. 3, an image decoding apparatus 30 may include an entropy-decoding unit 305, a prediction unit 310, an inverse quantization unit 315, an inverse transformation unit 320, an adder-subtracter 325, a filter 330, and a decoded picture buffer 335.

Also, the prediction unit 310 may include an intra-prediction module and an inter-prediction module.

First, when an image bitstream is received from the image encoding apparatus 20, the received bitstream may be delivered to the entropy-decoding unit 305.

The entropy-decoding unit 305 may decode the bitstream to decode quantized coefficients and decoding data including decoding information delivered to each element.

The prediction unit 310 may generate a prediction block on the basis of the data delivered from the entropy-decoding unit 305. In this case, a reference picture list may be configured using a default configuration technique on the basis of a reference image decoded and stored in the decoded picture buffer 335.

The intra-prediction unit may include a reference picture configuration unit, a reference pixel filter unit, a reference pixel interpolation unit, a prediction block generation unit, and a predictive mode decoding unit. The inter-prediction unit may include a reference picture configuration unit, a motion compensation unit, and a motion information decoding unit. Some of the units may perform the same process as the encoder, and some of the units may perform a process for reverse induction.

The inverse quantization unit 315 may inversely quantize quantized transformation coefficients provided in the bitstream and decoded by the entropy-decoding unit 305.

The inverse transformation unit 320 may apply the inverse DCT, the inverse integer transformation, or inverse-transformation techniques with similar concepts to the transformation coefficients to generate a residual block.

In this case, the inverse quantization unit 315 and the inverse transformation unit 320 may be implemented in various methods to inversely perform the process performed by the transformation unit 210 and the quantization unit 215 of the image encoding apparatus 20, which has been described above. For example, the inverse quantization unit 315 and the inverse transformation unit 320 may use inverse transformation and the same process shared with the transformation unit 210 and the quantization unit 215, and the inverse quantization unit 315 may inversely perform a transformation and quantization process using information (e.g., a transformation size, a transformation form, a quantization type, etc.) regarding the transformation and quantization process received from the image encoding apparatus 20.

A restored image block may be generated by adding the residual block on which the inverse quantization and inverse transformation process is performed to the prediction block derived by the prediction unit 310. The adding may be achieved by the adder-subtracter 325.

A deblocking filter may be applied to the restored image block as the filter 330 in order to remove a blocking phenomenon if necessary, and different loop filters may be additionally used before and after the decoding process in order to enhance video quality.

The image block on which the restoration and filtering are performed may be stored in the decoded picture buffer 335.

Although not shown, the image encoding/decoding apparatus may further include a picture split unit and a block split unit.

The picture split unit may split (or partition) a picture into at least one processing unit such as a color space (YCbCr, RGB, or XYZ), a tile, a slice, and a basic encoding unit (or a maximum encoding unit), and the block split unit may split (or partition) a basic encoding unit into at least one processing unit (e.g., encoding, prediction, transformation, quantization, entropy, and in-loop filter unit).

The basic encoding unit may be acquired by splitting the picture at certain distances in horizontal and vertical directions. On the basis of the split, the tile, slice, and the like may be split (i.e., a split unit such as a tile and a slice is configured as an integral multiple of the basic encoding block; however, exceptional cases may occur in a split unit located at an image boundary), but the present invention is not limited thereto.

For example, a picture may be partitioned into basic encoding units and then split into the units, or may be partitioned into the units and then split into the basic encoding units. The following description assumes that the partitioning and splitting order of each unit corresponds to the former. However, the present invention is not limited thereto, and the latter may be possible according to the encoding/decoding settings. The latter case may be modified into a case in which the size of the basic encoding unit is adaptive depending on a split unit (a tile, etc.) (i.e., a basic encoding block of a different size may be applied to each unit).

In the present invention, an example will be described in which a case of partitioning a picture into basic encoding units is set as a default (i.e., a picture is not split into tiles or slices, or a picture is a single tile or a single slice). However, it should be understood that, as described above, even when a picture is split into basic encoding units on the basis of a unit acquired by partitioning each split unit first, the settings and the like to be proposed in the following various examples are applied without or after being modified.

Among the split units, the slice may be composed of a group of at least one or more consecutive blocks according to a scanning pattern, and the tile may be composed of a rectangular group of spatially adjacent blocks. Also, any other additional split unit may be supported and configured according to its definition. In particular, like a checkered pattern, a picture may be split into tiles using one or more horizontal and vertical lines. Alternatively, the picture may be composed of rectangles having various sizes, rather than being uniformly split by horizontal and vertical lines.

Meanwhile, the picture may be split into encoding units (or blocks) having various sizes through the block split unit.

In this case, the encoding unit may be composed of a plurality of encoding blocks (e.g., one luminance encoding block and two chrominance encoding blocks, etc.) according to a color format, and the size of the blocks may be determined according to the color format. For convenience of description, a block corresponding to one color component (luminance component) will be described below as a reference.

It should be understood that the following description is directed to one color component, but may be changed and applied to other color components in proportion to a length ratio corresponding to the color format (e.g., as for YCbCr 4:2:0, a length aspect ratio between the luminance component and the chrominance component is 2:1). Also, it should be understood that a block split dependent on another color component (e.g., CbCr is dependent on a result of a block split of Y) may be possible, but a block split independent of each color component may be possible. Also, one common block split setting may be used (considering proportion to a length ratio), but it is also necessary to understand that an individual block split setting is used depending on a color component.

The encoding block may have a variable size of M×M (e.g., M is 4, 8, 16, 32, 64, 128, or the like). Alternatively, depending on a split scheme (e.g., a tree-based split, a quad tree (QT) split, binary tree (BT), etc.), the encoding block may have a variable size or form of M×N (e.g., M and N are 4, 8, 16, 32, 64, 128, or the like). In this case, the encoding block may be a unit which is a basis for intra-prediction, inter-prediction, transformation, quantization, entropy coding, and the like, and it is assumed that the block is a unit that may be acquired after each unit is determined.

The block split unit may be set in association with each element of the image encoding apparatus and the image decoding apparatus. Through this process, the size and form of the block may be determined. In this case, a different block may be defined for each element. The block may be a prediction block for the prediction unit, a transformation block for the transformation unit, a quantization block for the quantization block, or the like. However, the present invention is not limited thereto, and an additional block unit may be defined for another element. The size and form of the block may be defined by horizontal and vertical lengths of the block.

A block may be acquired by the block split unit in the range from a minimum value to a maximum value. For example, when the block supports the form of a square and has a maximum value of 256×256 and a minimum value of 8×8, a block with a size of $2^m \times 2^m$ (here, m is an integer from 3 to 8; for example, 8×8, 16×16, 32×32, 64×64, 128×128, and 256×256), a block with a size of $2^m \times 2^m$ (here, m is an integer from 4 to 128), or a block with a size of m×m (here, m is an integer from 8 to 128) may be acquired.

Alternatively, when the block supports the form of a square and a rectangle and has the same range as described above, a block with a size of $2^m \times 2^n$ (here, m and n are integers from 3 to 8; when it is assumed that the maximum aspect ratio is 2:1, 8×8, 8×16, 16×8, 16×16, 16×32, 32×16, 32×32, 32×64, 64×32, 64×64, 64×128, 128×64, 128×128, 128×256, 256×128, 256×256) may be acquired. However, there may be no limitation on the aspect ratio depending on the encoding/decoding settings, or the maximum value of the ratio (e.g., 1:2, 1:3, 1:7, etc.) may exist. Alternatively, a block with a size of $2^m \times 2^n$ (here, m and n are integers from 4 to 128) may be acquired, and also a block with a size of m×m (here, m and n are integers from 8 to 256) may be acquired.

The block capable of being acquired by the block split unit may be determined according to the encoding/decoding settings (e.g., a block type, a split scheme, and a split setting). For example, the encoding block may be acquired as a block with a size of $2^m \times 2^n$, the prediction block may be acquired as a block with a size of $2^m \times 2^n$ or m×n, and the transformation block may be acquired as a block with a size of $2^m \times 2^n$. In other words, information regarding the size and range of the blocks (e.g., information related to an exponent and a multiple) may be generated on the basis of the encoding/decoding settings.

The range, such as the maximum value and the minimum value of the block size, may be determined depending on the block type. Also, some blocks may have block range information explicitly generated, and other blocks may have block range information implicitly generated. For example, the encoding block and the transformation block may have related information explicitly generated, and the prediction block may have related information implicitly processed.

In the explicit case, at least one piece of range information may be generated. For example, the range information of the encoding block may be generated as information regarding the maximum value and the minimum value and on the basis of a difference between the maximum and the predetermined minimum value (e.g., eight). In other words, the range information may be generated based on the settings and may be generated based on information regarding an exponent difference value between the maximum value and the minimum value. However, the present invention is not limited thereto. Also, a plurality of pieces of range information for horizontal and vertical lengths of a rectangular block may be generated.

In the implicit case, the range information may be acquired on the basis of the encoding/decoding settings (e.g., a block type, a split scheme, a split setting, etc.). For example, for the prediction block, the encoding block (e.g., having a maximum size of M×N and a minimum size of m×n), which is an upper unit, may acquire information regarding the maximum value and the minimum value according to a candidate group (here, M×N and m/2×n/2) acquirable from split settings (e.g., a quad tree split+a split depth of 0) of the prediction block.

The size and form of an initial block of the block split unit may be determined from its upper unit. In other words, the encoding block may have the basic encoding block as an initial block, and the prediction block may have the encoding block as an initial block. Also, the transformation block may have the encoding block or the prediction block as an initial block, which may be determined according to the encoding/decoding settings.

For example, the prediction block is an upper unit of the transformation block when the encoding mode is an intra mode, and the prediction block is a unit that is independent of the transformation block when the encoding node is an inter mode. The initial block, which is a start unit for split, may be split into blocks of a small size. When an optimal size and form corresponding to the block split are determined, the block may be determined as an initial block of a lower unit. The initial block, which is the start unit for the split, may be considered as an initial block of an upper unit. Here, the upper unit may be an encoding block, and the lower unit may be a prediction block or a transformation block. However, the present invention is not limited thereto. As described above, when the initial block of the lower unit is determined, a split process for finding a block of the optimal size and form may be performed.

In summary, the block split unit may split the basic encoding unit (or the maximum encoding unit) into at least one encoding unit (or lower encoding unit). Also, the encoding unit may be split into at least one prediction unit and also may be split into at least one transformation unit. The encoding unit may be split into at least one encoding block, and the encoding block may be split into at least one prediction block and also may be split into at least one transformation block. Also, the prediction unit may be split into at least one prediction block, and the transformation unit may be split into at least one transformation block.

According to the above example, a different split setting is applied depending on a block type. Also, some blocks may be combined with other blocks, and thus a single split process may be performed. For example, when an encoding block and a transformation block are combined into one unit, a split process for acquiring an optimal block size and form is performed. Thus, the optimal block size and form may be the optimal size and form of the transformation block as well as the optimal size and form of the encoding block. Alternatively, the encoding block and the transformation block may be combined into one unit, the prediction block and the transformation block may be combined into one unit, or the encoding block, the prediction block, and the transformation block may be combined into one unit. Also, the combination of other blocks may be possible.

When the block of the optimal size and form is found as described above, mode information related to the block (e.g., split information, etc.) may be generated. The mode information may be contained in a bitstream in addition to information generated in a configuration unit to which the block belongs (e.g., prediction-related information and transformation-related information) and then transmitted to a decoder. The mode information may be parsed by the decoder at units of the same level and then used during an image decoding process.

The split scheme will be described below. For convenience of description, it is assumed that the initial block has the form of a square. However, when the initial block has the form of a rectangle, the split scheme may be applied in the same or similar manner. Accordingly, the present invention is not limited thereto.

Figure 4:
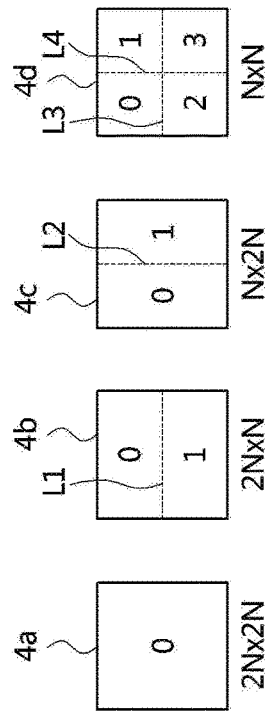
FIG. 4 is a view showing a tree-based block form according to an embodiment of the present invention.

FIG. 4 is a view showing a tree-based block form according to an embodiment of the present invention.

The block form may be determined according to the type of a tree used for splitting. Referring to FIG. 4, there may be a single 2N×2N block on which a split is not performed, two 2N×N blocks on which a binary tree-based horizontal split is performed, two N×2N blocks on which a binary tree-based vertical split is performed, four blocks N×N on which a quad tree-based split is not performed, and the like. However, the present invention is not limited thereto.

In detail, acquirable candidate blocks may be blocks 4a and 4b when the quad tree-based split is performed, and acquirable candidate blocks may be blocks 4a, 4b, and 4c when the binary tree-based split is performed.

When the quad tree-based split is performed, one split flag may be supported. Here, the one split flag may be a split presence flag. In other words, when the split flag of the quad tree is 0, the split is not performed such that the block 4a may be acquired. Also, when the split flag is 1, the split is performed such that the block 4d may be acquired.

When the binary tree-based split is performed, a plurality of split flags may be supported. Here, one of the plurality of split flags may be a split presence flag, and another split flag may be a split direction flag. In other words, when the split presence flag, among the split flags of the binary tree, is 0, the split is not performed such that the block 4a may be acquired. Also, when the split presence flag is 1, the block 4b or 4c may be acquired depending on the split direction flag.

Figure 5:
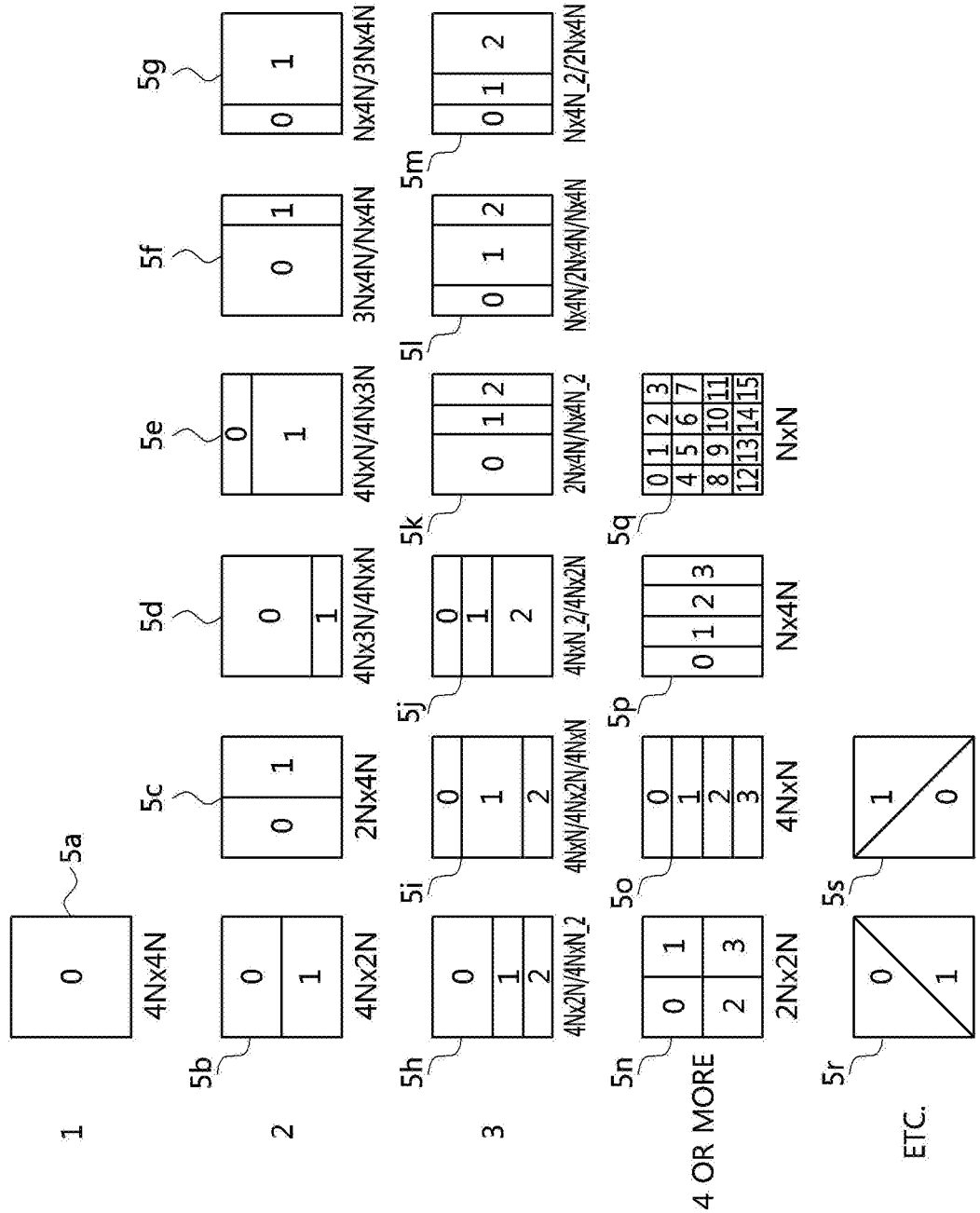
FIG. 5 is a view showing various block forms according to an embodiment of the present invention.

FIG. 5 is a view showing various block forms according to an embodiment of the present invention.

Referring to FIG. 5, a block (with a size of 4N×4N) may be split in the various forms depending on split settings and split methods and also may be split in another form, which is not shown in FIG. 5.

In an embodiment, a tree-based asymmetric split may be allowed. For example, for the binary tree-based split, the block (with a size of 4N×4N) may allow symmetric blocks with sizes of 4N×2N (5b) and 2N×4N (5c) and may allow asymmetric blocks with sizes of 4N×3N/4N×N (5d), 4N×N/4N×3N (5e), 3N×4N/N×4N (5f), and N×4N/3N×4N (5g). When among the split flags, a flag for allowing an asymmetric split is explicitly or implicitly inactivated according to split settings or the like, a candidate block may be the block 5b or 5c depending on the split direction flag. When a flag for allowing an asymmetric split is activated, candidate blocks may be the blocks 5b, 5d, and 5e or 5c, 5f, and 5g. Here, the blocks 5d to 5g according to the asymmetric split may have a horizontal or vertical length ratio of 1:3 or 3:1, but the length ratio may be 1:2, 1:4, 2:3, 2:4, or 3:4. Thus, the present invention is not limited thereto.

The split flag of the binary tree may further include a split form flag in addition to the split presence flag and the split direction flag. Here, the split form flag may indicate symmetry or asymmetry. When the split form flag indicates asymmetry, a flag indicating a split ratio may be generated. The flag indicating the split ratio may indicate an index allocated to a predetermined candidate group. For example, when a split ratio of 1:3 or 3:1 is supported for a candidate group, the split ratio may be selected through a 1-bit flag.

Also, the split flag of the binary tree may further include the flag indicating the split ratio in addition to the split presence flag and the split direction flag. In this case, a candidate having a symmetric ratio of 1:1 may be included as the candidate for the split ratio.

In the present invention, the binary tree will be described assuming that configuration is made with an additional split form flag. Unless otherwise specified, the binary tree may indicate a symmetric binary tree.

In another embodiment, additional tree vision may be allowed to the tree-based split. For example, a ternary tree-based split, a quad tree-based split, an octa tree-based split, and the like may be allowed, and thus n split blocks (here, n is an integer) may be acquired. In other words, three split blocks may be acquired through the ternary tree, four split blocks may be acquired through the quad type tree, and eight split blocks may be acquired through the octa tree.

The ternary tree may support blocks with sizes of 4N×2N/4N×N_2 (5h), 4N×N/4N×2N/4N×N (5i), 4N×N2/4N×2N (5j), 2N×4N/N×4N_2 (5k), N×4N/2N×4N/N×4N (5l), and N×4N 2/2N×4N (5m), the quad type tree may support blocks with sizes of 2N×2N (5n), 4N×N (5o), and N×4N (5p), and the octa tree may support a block with a size of N×N (5q).

Whether to support a tree-based split may be implicitly determined according to the encoding/decoding settings, and its associated information may be explicitly generated. Also, the binary tree-based split, the ternary tree-based split, and the quad tree-based split may be used solely or in combination depending on the encoding/decoding settings.

For example, the binary tree may support the block 5b or 5c depending on the split direction. Accordingly, when it is assumed that the use range of the binary tree partially overlaps that of the ternary tree, the blocks 5b, 5c, 5i, and 5l may be supported by mixing the binary tree and the ternary tree. When other than the existing flags, a flag for allowing an additional split is explicitly or implicitly inactivated according to the encoding/decoding settings, an acquirable candidate block may be a block 5b or 5c. When the flag for allowing the additional split is activated, acquirable candidate blocks may be blocks 5b and 5i (or 5b, 5h, 5i, and 5j) or blocks 5c and 5l (or 5c, 5k, 5l, and 5m).

Here, a horizontal (left/middle/right) length ratio or a vertical (top/middle/bottom) length ratio of the ternary tree-based split is 2:1:1, 1:2:1, or 1:1:2, but other ratios are possible depending on the encoding settings, and thus the present invention is not limited thereto.

When the ternary tree-based split is performed, a plurality of split flags may be supported. Here, one of the plurality of split flags may be a split presence flag, another split flag may be a split direction flag, and a split ratio flag may be further included. These split flags may be similar to those of the binary tree. In the present invention, it is assumed that there is one candidate in which a ratio supported according to the split direction is 1:2:1 such that the split ratio flag is omitted.

In the present invention, adaptive encoding/decoding settings may be applied according to the split scheme.

In an embodiment, the split scheme may be determined according to a block type. For example, an encoding block and a transformation block may be subject to the quad tree-based split, and the prediction block may be subject to the quad tree-based split and the binary tree-based split (or the ternary tree-based split).

In another embodiment, the split scheme may be determined according to a block size. For example, the quad tree-based split may be possible in a first range (e.g., from a×b to c×d) between the minimum value and the maximum value of the block, and the binary tree-based (or the ternary tree-based) split may be possible in a second range (e.g., from e×f to g×h). Here, the first range may have a larger size than the second range, but the present invention is not limited thereto. Here, range information according to the split scheme may be explicitly generated or implicitly determined, and the ranges may overlap each other.

In still another embodiment, the split scheme may be determined according to the form of a block (or a block before the split). For example, when the block has the form of a square, the quad tree-based split and the binary tree-based (or the ternary tree-based) split may be possible. Alternatively, when the block has the form of a rectangle, the binary tree-based (or the ternary tree-based) split may be possible.

The tree-based split may be performed in a recursive way. For example, when a split flag of an encoding block having a split depth of k is 0, the encoding of the encoding block may be performed on the encoding block having a split depth of k. When the split flag of the encoding block having a split depth of k is 1, the encoding of the encoding block may be performed on four sub-encoding blocks (for the quad tree-based split), two sub-encoding blocks (for the binary tree-based split), or three sub-encoding blocks (for the ternary tree-based split), each of which has a split depth of k+1. The sub-encoding block may be set as an encoding block k+1 and split into sub encoding blocks k+2. This hierarchical split scheme may be determined according to split settings such as a split range and a split-allowable depth.

In this case, a bitstream structure for presenting split information may select one or more scan methods. For example, the bitstream of the split information may be configured on the basis of a split depth order or on the basis of the present of a split. For example, a method based on a split depth order refers to a method of acquiring split information corresponding to the current level depth and then split information corresponding to the next level depth on the basis of an initial block level, and a method based on the presence of a split refers to a method of preferentially acquiring additional split information of a block split on the basis of the initial block. In this case, another additional scan method may be considered. In the present invention, it is assumed that the bitstream of the split information is configured on the basis of the presence of a split.

As described above, a split based on a single tree or splits based on a plurality of trees may be supported depending on the encoding/decoding settings.

When the splits based on the plurality of trees are possible, the splits may be performed according to predetermined priorities. In detail, it is assumed that the splits are performed according to the priorities. When a split with a higher priority is performed (i.e., the split is made into two or more blocks), a split at a corresponding split depth ends, and a sub-block is set as an encoding block and then split at the next split depth. When the split with the higher priority is not performed, a split with the next higher priority may be performed. When none of the tree-based splits are performed, a split process at the corresponding block ends.

When a split flag corresponding to a higher priority is true (split: 0) in the above example, additional split information of the corresponding split scheme may follow. When the flag is false (split: X), split information (a split flag, a split direction flag, etc.) of a split scheme corresponding to the next higher priority may be configured.

When a split is performed by at least one split scheme in the above example, a split may be performed on the next sub-block (or the next split depth) according to the priorities. Alternatively, a split corresponding to a higher priority at which a split is not performed as a result of the previous split may be excluded from a split candidate group of the next sub-block.

For example, when the quad tree-based split and the binary tree-based split are supported and the quad tree has a higher priority and the quad tree-based split is performed at a split depth k, the quad tree-based split may be performed on the sub-block having a split depth k+1 when the split is made based on the quad tree.

When the binary tree-based split, instead of the quad tree-based split, is made at the split depth k, the quad tree-based split may be performed on the next sub-block having the split depth k+1 first, or only the binary tree-based split may be allowed by excluding the quad tree from the candidate group. This may be determined according to the encoding/decoding settings. In the present invention, the following description assumes the latter case.

When splits based on a plurality of trees are possible, information for selecting a split scheme may be additionally generated, and the split may be performed according to the selected split scheme. In the present example, the split information according to the selected split scheme may follow.

Figure 6:
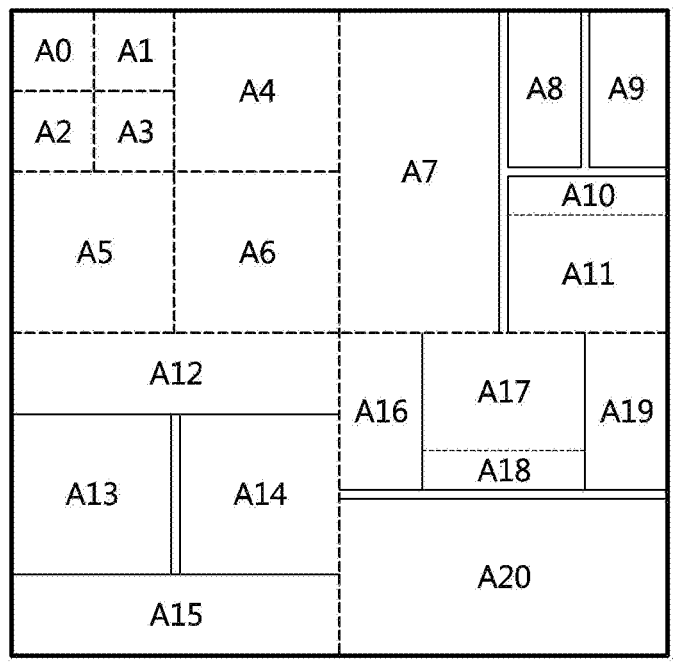
FIG. 6 is a view showing a block for illustrating a block split according to an embodiment of the present invention.

FIG. 6 is a view showing a block for illustrating a block split according to an embodiment of the present invention.

The size and form of a block acquirable according to one or more split methods, starting from a basic encoding block, will be described below, but this is merely an example and the present invention is not limited thereto. Also, split settings such as a split type, split information, and a split information configuration order to be described below are merely examples, and the present invention is not limited thereto.

Referring to FIG. 6, a thick solid line may represent a basic encoding block, a thick dashed line may represent a quad tree split boundary, and a double solid line may represent a symmetric binary tree split boundary. Also, a solid line may represent a ternary tree split boundary, and a thin dashed line may represent an asymmetric binary tree split boundary.

For convenience of description, it is assumed that an upper left block, an upper right block, a lower left block, and a lower right block (e.g., 64×64) with respect to the basic encoding block (e.g., 128×128) have individual block split settings.

Also, it is also assumed that four sub-blocks (upper left, upper right, lower left, and lower right blocks) are acquired from an initial block (e.g., 128×128), and thus the split depth increases from 0 to 1, and split settings for the quad tree, i.e., split settings such as the maximum block with a size of 128×128, the minimum block with a size of 8×8, and the maximum split depth of 4 are applied to the blocks in common.

Also, when the splits based on multiple trees are supported by each sub-block, the size and form of an acquirable block may be determined through split settings for a plurality of blocks. In this example, for the binary tree and the ternary tree, it is assumed that the maximum block has a size of 64×64, the minimum block has a length of 4, and the maximum split depth is 4.

Under the assumption, the upper left block, the upper right bock, the lower left block, and the lower right block will be described individually.

1. Upper left blocks A0 to A6.

An upper left block (with a size of 4M×4N) represents that a split based on a single tree is supported, the size and form of an acquirable block may be determined through one block split setting such as the maximum block, the minimum block, and the split depth.

The upper left block indicates a case in which one block is acquirable according to a split. Split information required for the split operation may be a split presence flag, and acquirable candidates may be 4M×4N and 2M×2N. Here, the split is not performed when the split presence flag is 0 and is performed when the split presence flag is 1.

Referring to FIG. 6, when the split presence flag is 1 while the current depth is 1, the upper left block (with a size of 4M×4N) may perform the quad tree-based split. Thus, the depth may increase from 1 to 2, and blocks A0 to A3, A4, A5, and A6 (each of which is 2M×2N) may be acquired.

When the splits based on multiple trees are supported as described below, information generated when only a quad tree-based split is possible is composed of a split presence flag as shown in this example, and a description thereof will be omitted.

2. Upper Right Blocks A7 to all

An upper right block (with a size of 4M×4N) represents a case in which splits based on multiple trees (a quad tree and a binary tree, presence of priorities for splits, the quad tree→the binary tree) are supported. The size and form of an acquirable block may be determined through split settings for a plurality of blocks.

The upper right block represents a case in which a block acquirable through a split has a plurality of forms, split information required for the split operation may be a split presence flag, a split type flag, a split form flag, and a split direction flag, and acquirable candidates may be 4M×4N, 4M×2N, 2M×4N, 4M×N/4M×3N, 4M×3N/4M×N, M×4N/3M×4N, and 3M×4N/M×4N.

When a target block is in a range where both the quad tree-based split and the binary tree-based split are allowed, different split information may be configured depending on whether both, or only one of the quad tree-based split and the binary tree-based split is possible.

In the above description, "possible range" means that a target block (with a size 64×64) may use the quad tree-based split of 128×128 to 8×8 and the binary-based split of 64×64 to $(64>>m)\times(64>>n)$ (here, m+n is 4), and "possible case" means that when a plurality of split schemes are supported, both or one of the quad tree-based split and the binary tree-based split is possible depending on a split order, a rule, and the like.

(1) Case in which Both of the Quad Tree-Based Split and the Binary Tree-Based Split are Possible

TABLE 1

|  | a | b | c | d | e |
|---|---|---|---|---|---|
| QT | 1 | | | | |
| No Split | 0 | 0 | | | |
| SBT hor | 0 | 1 | 0 | 0 | |
| ABT hor ¼ | 0 | 1 | 0 | 1 | 0 |
| ABT hor ¾ | 0 | 1 | 0 | 1 | 1 |
| SBT ver | 0 | 1 | 1 | 0 | |
| ABT ver ¼ | 0 | 1 | 1 | 1 | 0 |
| ABT ver ¾ | 0 | 1 | 1 | 1 | 1 |

In Table 1, a may represent a flag indicating the presence of the quad tree-based split, and b may represent a flag indicating the presence of the binary tree-based split. Also, c may represent a flag indicating a split direction, d may represent a flag indicating a split type, and e may represent a flag indicating a split ratio.

Referring to Table 1, the split information may indicate that the quad tree (QT)-based split is performed when a is 1 and may further include b when a is 0. When b is 0, the split information may indicate that no further split is performed in a corresponding block. When b is 1, the split information may indicate that the binary tree (BT)-based split is performed and may further include c and d. The split information may indicate a horizontal split when c is 0 and a vertical split when c is 1. The split information may indicate that a symmetric binary tree (SBT) split is performed when d is 0, and may indicate am asymmetric binary tree (ABT) split is performed and may further include e when d is 1. The split information may indicate a split with a horizontal or vertical block ratio of 1:4 when e is 0 and may indicate a split with the opposite ratio (3:4) when e is 1.

(2) Case in which Only the Binary Tree-Based Split is Possible.

TABLE 2

|  | b | c | d | e |
|---|---|---|---|---|
| No Split | 0 | | | |
| SBT hor | 1 | 0 | 0 | |
| ABT hor ¼ | 1 | 0 | 1 | 0 |
| ABT hor ¾ | 1 | 0 | 1 | 1 |
| SBT ver | 1 | 1 | 0 | |
| ABT ver ¼ | 1 | 1 | 1 | 0 |
| ABT ver ¾ | 1 | 1 | 1 | 1 |

In Table 2, b to e may represent the same flags as those of Table 1.

Referring to Table 2, split information corresponding to a case in which only the binary tree-based split is possible may be the same as that in Table 1, except for a flag a indicating the presence of the quad tree-based split. In other words, the split information corresponding to the case in which only the binary tree-based split is possible may start with b.

Referring to FIG. 6, among the upper right blocks, the block A7 is an upper right block before the split and on which the binary tree-based split is performed although the quad to tree-based split is allowed. Accordingly, the split information may be generated according to Table 1.

On the other hand, the blocks A8 to A11 are an upper right block before the split and on which the binary tree-based split is performed rather than the quad tree-based split, that is, the quad tree-based split is no longer possible. Accordingly, the split information may be generated according to Table 2.

3. Lower Left Blocks A12 to A15

A lower left block (with a size of 4M×4N) represents a case in which splits based on multiple trees (a quad tree, a binary tree, and a ternary tree, presence of priorities for splits, the quad tree→the binary tree or the ternary tee; also, split scheme selection is possible; the binary tree or the ternary tree) are supported. The size and form of an acquirable block may be determined through split settings for a plurality of blocks.

The lower left block represents a case in which a block acquirable through a split has a plurality of sizes and forms, split information required for the split operation may be a split presence flag, a split type flag, and a split direction flag, and acquirable candidates may be 4M×4N, 4M×2N, 2M×4N, 4M×N/4M×2N/4M×N, and M×4N/2M×4N/M×4N.

When a target block is in a range where all of the quad tree-based split, the binary tree-based split, and the ternary tree-based split are allowed, different split information may be configured depending on whether all of the quad tree-based split, the binary tree-based split, and the ternary tree-based split are possible or not.

(1) Case in which Both of the Quad Tree-Based Split and the Binary Tree-Based/Ternary Tree-Based Split are Possible

TABLE 3

|        | a | b | c | d |
|--------|---|---|---|---|
| QT     | 1 |   |   |   |
| No Split | 0 | 0 |   |   |
| BT hor | 0 | 1 | 0 | 0 |
| TT hor | 0 | 1 | 0 | 1 |
| Bt ver | 0 | 1 | 1 | 0 |
| TT ver | 0 | 1 | 1 | 1 |

In Table 3, a may represent a flag indicating the presence of the quad tree-based split, and b may represent a flag indicating the presence of the binary tree-based split or the ternary tree-based split. Also, c may represent a flag indicating a split direction, and d may represent a flag indicating a split type.

Referring to Table 3, the split information may indicate that the quad tree (QT)-based split is performed when a is 1 and may further include b when a is 0. When b is 0, the split information may indicate that no further split is performed in a corresponding block. When b is 1, the split information may indicate that the binary tree (BT)-based or the ternary tree (TT)-based split is performed and may further include c and d. The split information may indicate a horizontal split when c is 0 and a vertical split when c is 1. The split information may indicate that the binary tree (BT)-based split is performed when d is 0, and may indicate that the ternary tree (TT)-based split is performed when d is 1.

(2) Case in which only the binary tree-based/ternary tree-based split is possible.

TABLE 4

|          | b | c | d |
|----------|---|---|---|
| No Split | 0 |   |   |
| BT hor   | 1 | 0 | 0 |
| TT hor   | 1 | 0 | 1 |
| Bt ver   | 1 | 1 | 0 |
| TT ver   | 1 | 1 | 1 |

In Table 4, b to d may represent the same flags as those of Table 3.

Referring to Table 4, split information corresponding to a case in which only the binary tree-based/ternary tree-based split is possible may be the same as that in Table 3, except for a flag a indicating the presence of the quad tree-based split. In other words, the split information corresponding to the case in which only the binary tree-based/ternary tree-based split is possible may start with b.

Referring to FIG. 6, among the lower left blocks, the blocks A12 and A15 are lower left blocks before the split, and on which the binary tree-based/ternary tree-based split is performed although the quad tree-based split is allowed. Accordingly, the split information may be generated according to Table 3.

On the other hand, the blocks A13 and A14 are lower left blocks before the split and on which the ternary tree-based split is performed rather than the quad tree-based split. Accordingly, the split information may be generated according to Table 4.

4. Lower Right Blocks A16 to A20

A lower right block (with a size of 4M×4N) represents a case in which splits based on multiple trees (which is the same as the lower left blocks; however, in this example, an asymmetric binary tree is supported) are supported. The size and form of an acquirable block may be determined through split settings for a plurality of blocks.

The lower right block represents a case in which a block acquirable through a split has a plurality of forms, split information required for the split operation may be a split presence flag, a split type flag, a split form flag, and a split direction flag, and acquirable candidates may be 4M×4N, 4M×2N, 2M×4N, 4M×N/4M×3N, 4M×3N/4M×N, M×4N/3M×4N, 3M×4N/M×4N, 4M×N/4M×2N/4M×N, and M×4N/2M×4N/M×4N.

When a target block is in a range where all of the quad tree-based split, the binary tree-based split, and the ternary tree-based split are allowed, different split information may be configured depending on whether all of the quad tree-based split, the binary tree-based split, and the ternary tree-based split are possible or not.

(1) Case in which Both of the Quad Tree-Based Split and the Binary Tree-Based/Ternary Tree-Based Split are Possible

TABLE 5

|          | a | b | C | d | e | f |
|----------|---|---|---|---|---|---|
| QT       | 1 |   |   |   |   |   |
| No Split | 0 | 0 |   |   |   |   |

TABLE 5-continued

|  | a | b | C | d | e | f |
|---|---|---|---|---|---|---|
| TT hor | 0 | 1 | 0 | 0 |  |  |
| SBT hor | 0 | 1 | 0 | 1 | 0 |  |
| ABT hor ¼ | 0 | 1 | 0 | 1 | 1 | 0 |
| ABT hor ¾ | 0 | 1 | 0 | 1 | 1 | 1 |
| TT ver | 0 | 1 | 1 | 0 |  |  |
| SBT ver | 0 | 1 | 1 | 1 | 0 |  |
| ABT ver ¼ | 0 | 1 | 1 | 1 | 1 | 0 |
| ABT ver ¾ | 0 | 1 | 1 | 1 | 1 | 1 |

In Table 5, a may represent a flag indicating the presence of the quad tree-based split, and b may represent a flag indicating the presence of the binary tree-based split or the ternary tree-based split. Also, c may represent a flag indicating a split direction, and d may represent a flag indicating a split type. e may represent a flag indicating a split form, and f may represent a flag indicating a split ratio.

Referring to Table 5, the split information may indicate that the quad tree (QT)-based split is performed when a is 1 and may further include b when a is 0. When b is 0, the split information may indicate that no further split is performed in a corresponding block. When b is 1, the split information may indicate that the binary tree (BT)-based or the ternary tree (TT)-based split is performed and may further include c and d. The split information may indicate a horizontal split when c is 0 and a vertical split when c is 1. When d is 0, the split information may indicate that the ternary tree (TT)-based split is performed. When d is 1, the split information may indicate that the binary tree (BT)-based split is performed and may further include e. When e is 0, the split information may indicate that the symmetric binary tree (SBT)-based split is performed. When e is 1, the split information may indicate that the asymmetric binary tree (ABT)-based split is performed and may further include f. The split information may indicate a split with a horizontal or vertical block ratio of 1:4 when f is 0 and may indicate a split with the opposite ratio (3:4) when f is 1.

(2) Case in which Only the Binary Tree-Based or the Ternary Tree-Based Split is Possible.

TABLE 6

|  | b | C | d | e | f |
|---|---|---|---|---|---|
| No Split | 0 |  |  |  |  |
| TT hor | 1 | 0 | 0 |  |  |
| SBT hor | 1 | 0 | 1 | 0 |  |
| ABT hor ¼ | 1 | 0 | 1 | 1 | 0 |
| ABT hor ¾ | 1 | 0 | 1 | 1 | 1 |
| TT ver | 1 | 1 | 0 |  |  |
| SBT ver | 1 | 1 | 1 | 0 |  |
| ABT ver ¼ | 1 | 1 | 1 | 1 | 0 |
| ABT ver ¾ | 1 | 1 | 1 | 1 | 1 |

In Table 6, b to f may represent the same flags as those of Table 5.

Referring to Table 6, split information corresponding to a case in which only the binary tree-based/ternary tree-based split is possible may be the same as that in Table 5, except for a flag a indicating the presence of the quad tree-based split. In other words, the split information corresponding to the case in which only the binary tree-based/ternary tree-based split is possible may start with b.

Referring to FIG. 6, among the lower right blocks, the block A20 is a lower left block before the split and on which the binary tree-based/ternary tree-based split is performed although the quad tree-based split is allowed. Accordingly, the split information may be generated according to Table 5.

On the other hand, the blocks A16 and A19 are lower right blocks before the split and on which the binary tree-based split is performed rather than the quad tree-based split. Accordingly, the split information may be generated according to Table 6.

Figure 7:
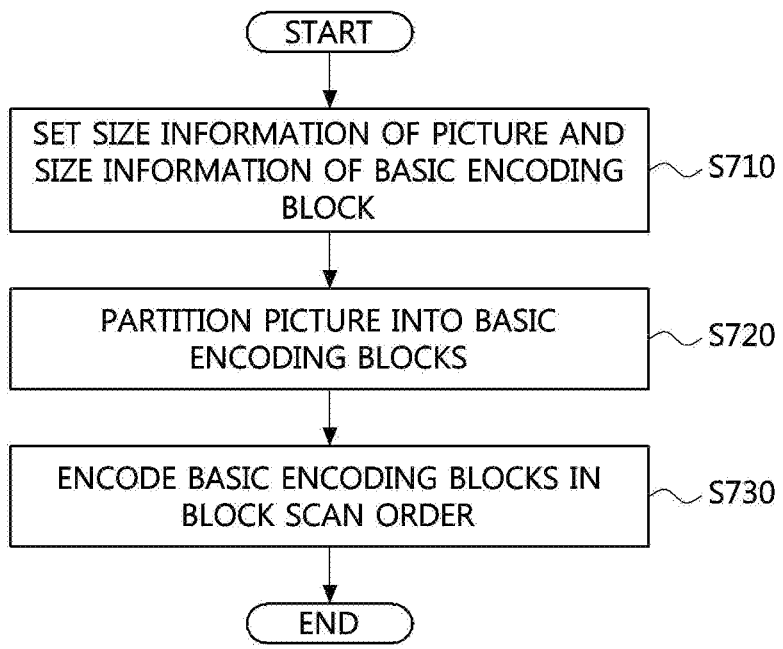
FIG. 7 is a flowchart showing an image encoding method according to an embodiment of the present invention.

FIG. 7 is a flowchart showing an image encoding method according to an embodiment of the present invention.

Referring to FIG. 7, an image encoding apparatus according to an embodiment of the present invention may set size information of a picture and size information of a basic encoding block (S710) and partition the picture into basic encoding blocks (S720). Also, the image encoding apparatus may encode the basic encoding block in a block scan order (S730) and transmit a bitstream corresponding to encoding to an image decoding apparatus.

Also, the image decoding apparatus according to an embodiment of the present invention may operate corresponding to the above-described image encoding apparatus. In other words, the image decoding apparatus may restore the size information of the picture and the size information of the basic encoding block on the basis of the bitstream received from the image encoding apparatus and may partition the picture into basic encoding blocks. Also, the image decoding apparatus may decode the basic encoding block in the block scan order.

Here, the size information of the basic encoding block may represent size information of the maximum block to be encoded, and the block scan order may be a raster scan order, but may follow various scan orders. Accordingly, the present invention is not limited thereto.

The size information may be expressed as an exponent of 2, the size information of the maximum block may be expressed as an exponent of 2 or as a difference in exponent of 2 from a predetermined specific size (e.g., 8 or 16). For example, when the basic encoding block has a value ranging from 8×8 to 128×128, the size information may be generated as a difference in exponent from 8. When the maximum block is a size of 64×64, the size information may be generated as $\log 2(64) - \log_2(8) = 3$. In this example, the size information of the basic encoding block has been described, but the description may be applied even when the maximum/minimum size information is explicitly generated depending on a tree type in the block split settings.

However, when the size of the picture is not configured as an integral multiple of the basic encoding block, encoding/decoding cannot be performed by the encoding/decoding as described above, and thus various modifications may be required. This will be described in detail below.

Also, in the following example, it is assumed that the picture is composed of one slice or tile. However, even when the picture is split into a plurality of slices or tiles, the block may not be composed of a basic encoding block size on a right or lower boundary with respect to the picture. This may be possible under settings in which a picture is split into blocks and then each of the blocks is split into tiles or slices (i.e., a unit located on the boundary may not be configured as an integral multiple of the block).

Also, when the picture is split into tiles, slices, or the like and then into blocks, other cases may be present. That is, since the size of the tiles, slices, or the like is set first, each of the tiles and the slices may not be configured as an integral multiple of the basic encoding to block. This means that a block on the middle of the picture, as well as the block on the right or lower boundary with respect to the picture, may not be composed of a basic encoding block size. Thus, this may be applied to the following example, but may be applied in consideration of the fact that each of the tiles and the slices is not configured as an integral multiple of the block.

Figure 8A:
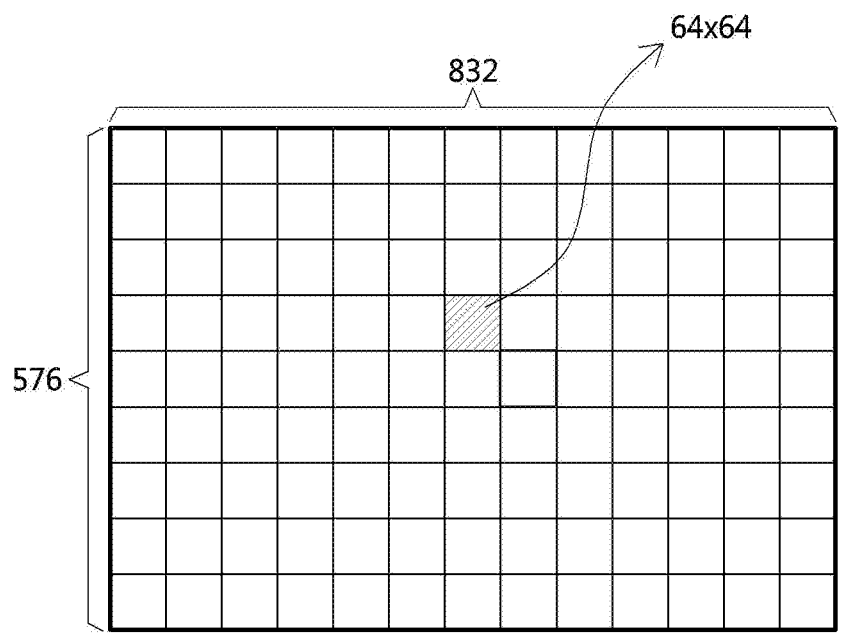
FIGS. 8A and 8B are views showing an image partitioned into basic encoding blocks of various sizes according to an embodiment of the present invention.
Figure 8B:
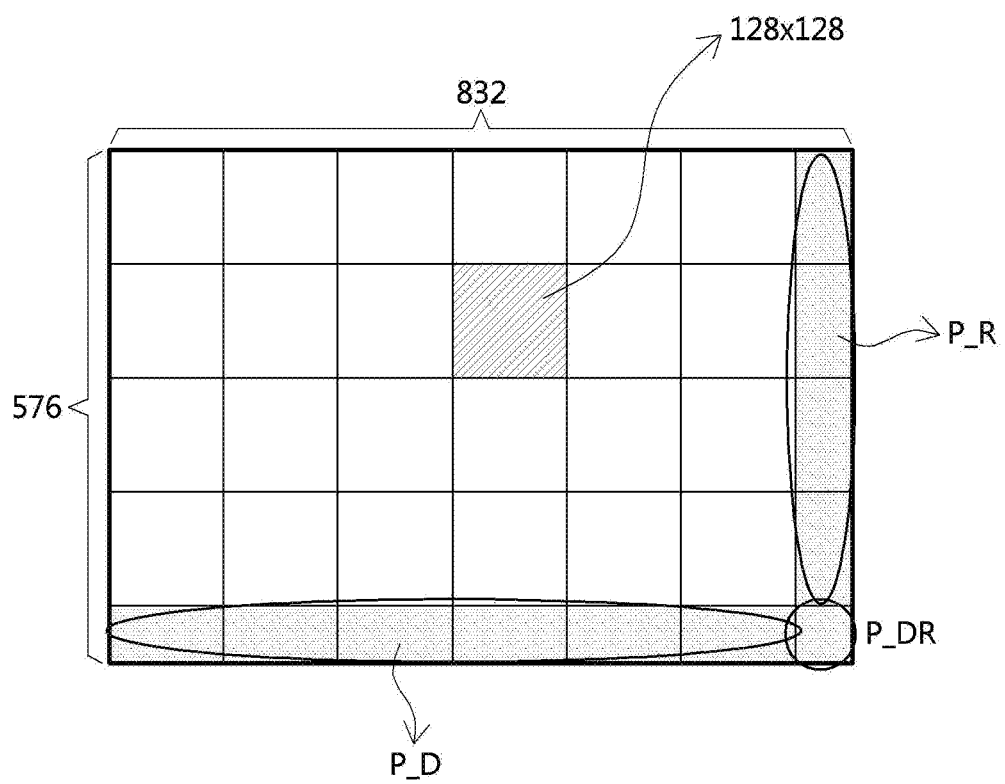

FIGS. 8A and 8B are views showing an image partitioned into basic encoding blocks of various sizes according to an embodiment of the present invention.

FIG. 8A is a view in which a 832×576 image is partitioned into 64×64 basic encoding blocks. Referring to FIG. 8A, the horizontal length of the picture (image) may be thirteen times as great as, and be an integral multiple of, the horizontal length of the basic encoding block, and the vertical length of the picture may be nine times as great as, and be an integral multiple of, the vertical length of the basic encoding block. Thus, the image may be partitioned into 117 basic encoding blocks and then encoded/decoded.

FIG. 8B is a view in which a 832×576 image is partitioned into 128×128 basic encoding blocks. Referring to FIG. 8B, the horizontal length of the picture is 6.5 times as great as, and is not an integral multiple of, the horizontal length of the basic encoding block, and the vertical length of the picture is 4.5 times as great as, and is not an integral multiple of, the vertical length of the basic encoding block.

In the present invention, an outer boundary of the image may refer to a boundary to the left, to the right, above, below, at an upper left corner, at a lower left corner, at an upper right corner, and at a lower right corner. However, generally, under an assumption that a block split is performed with respect to upper left coordinates of the image, the following description will focus on the boundary to the right, below, and at the lower right of the picture.

Referring to FIG. 8B, when a region located on the outer boundary of the image is partitioned into basic encoding blocks, coordinates in an upper left corner of a corresponding block may be present inside the picture, but coordinates in a lower right corner may be present outside the picture. Depending on the location of the corresponding block (a right boundary, a lower boundary, and an upper right boundary), coordinates in an upper right corner may be present outside the picture (P_R), coordinates in a lower left corner may be present outside the picture (P_D), and both of the coordinates may be present outside the picture (P_DR).

Here, 24 128×128 basic encoding blocks, which are not located on the outer boundary of the image may be encoded/decoded, but each of the regions P_R, P_D, and P_DR located on the outer boundary of the image is not partitioned into basic encoding blocks. Thus, other processing may be required.

In order to solve such a situation, various methods may be supported. For example, a method of expanding (or padding) and encoding/decoding an image, a method of specifying an exceptional case of basic encoding blocks to perform encoding/decoding, and the like may be supported. Here, the method of expanding and encoding/decoding the image may be performed in order to maintain uniformity of image encoding/decoding structure, and the method of specifying the exceptional case of the basis encoding blocks may be performed in order to enhance image encoding/decoding performance.

In the present invention, in order to solve a case in which the size of the picture is not an integral multiple of the size of the basic encoding block, 1: a basic encoding block adjustment method, 2: an image size adjustment method, 3: the adaptive image data processing method, and 4: an adaptive image data processing method according to a plurality of split methods will be described in detail.

1. Basic Encoding Block Adjustment Method

The basic encoding block adjustment method is a method of borrowing at least one block supported by the block split unit when the size of the picture is not an integral multiple of the size of the basic encoding block.

Figure 9:
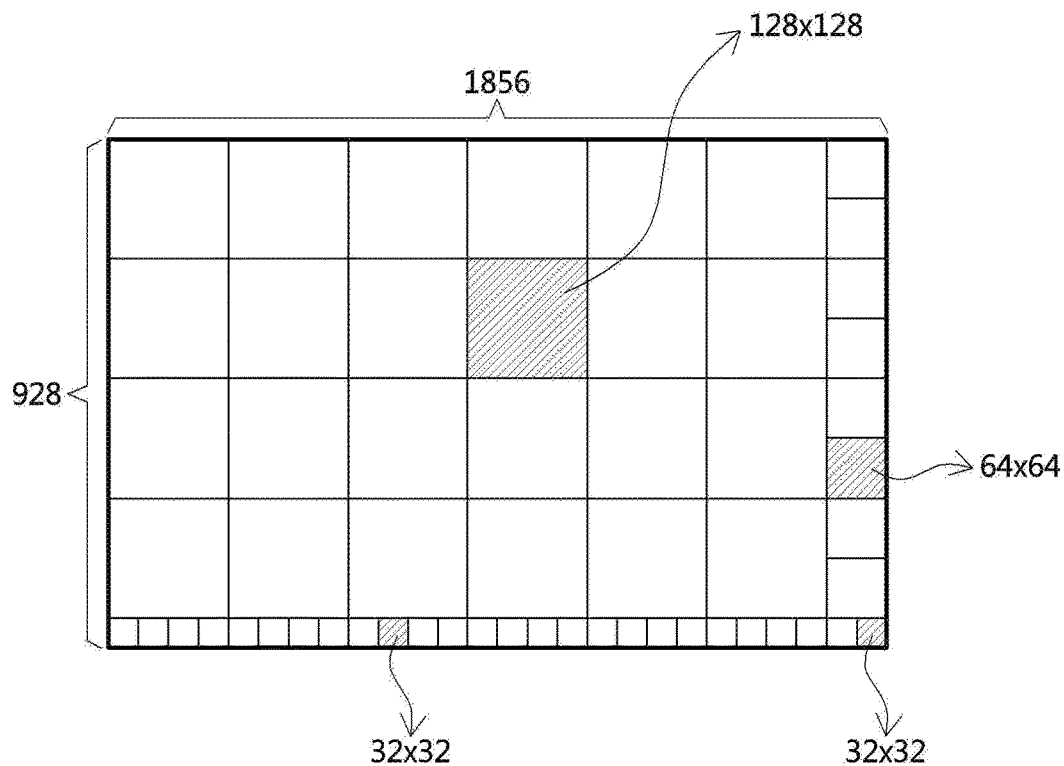
FIG. 9 is a first example diagram illustrating a basic encoding block adjustment method according to an embodiment of the present invention.

FIG. 9 is a first example diagram illustrating a basic encoding block adjustment method according to an embodiment of the present invention.

Referring to FIG. 9, when the picture has a size of 1856×928, the basic encoding block has a size of 128×128, a split based on a single tree such as a quad tree is supported, and the minimum block has a size of 8×8, the basic encoding block may borrow 64×64, 32×32, 16×16, and 8×8 blocks through the block split unit. Here, when the 128×128 block having a split depth of 0 is not split, the 128×128 block may be borrowed, but the size of the picture is not an integral multiple of 128×128. Thus, the 128×128 block may be removed from the candidate group.

Since the picture has a horizontal length of 1856 and the basic encoding block has a horizontal length of 128, a length of 64 may be left on a right boundary of the picture. Here, since the block located on the right boundary of the picture may have a size of 64×128, the basic encoding block may borrow a 64×64 block among the candidate blocks supported by the block split unit. Here, the borrowed block may be a maximum-sized block or a minimum number of blocks with respect to 64×128 among the candidate blocks. When a 64×64 block is borrowed, 64×128 may be composed of two 64×64 blocks.

Also, since the picture has a vertical length of 928 and the basic encoding block has a vertical length of 128, a length of 32 may be left on a lower boundary of the picture. Here, since the block located on the lower boundary of the picture may have a size of 128×32, the basic encoding block may borrow a 32×32 block among the candidate blocks supported by the block split unit. Here, the borrowed block may be a maximum-sized block or a minimum number of blocks with respect to 128×32 among the candidate blocks. When a 32×32 block is borrowed, 128×32 may be composed of four 32×32 blocks.

Since the block located on the lower right boundary of the picture has a size of 64×32, the basic encoding block may borrow a 32×32 block among the candidate blocks supported by the block split unit. Here, the borrowed block may be a block having a maximum size or a minimum number of blocks with respect to 64×32 among the candidate blocks. When the 32×32 block is borrowed, 64×32 may be composed of two 32×32 blocks.

In other words, one basic encoding block (with a size of 128×128) may be composed of two adjusted basic encoding blocks (with a size of 64×64) on the right boundary of the image, four adjusted basic encoding blocks (with a size of 32×32) on the lower boundary of the image, or two adjusted basic encoding blocks (with a size of 32×32) on the lower right boundary of the image.

Figure 10:
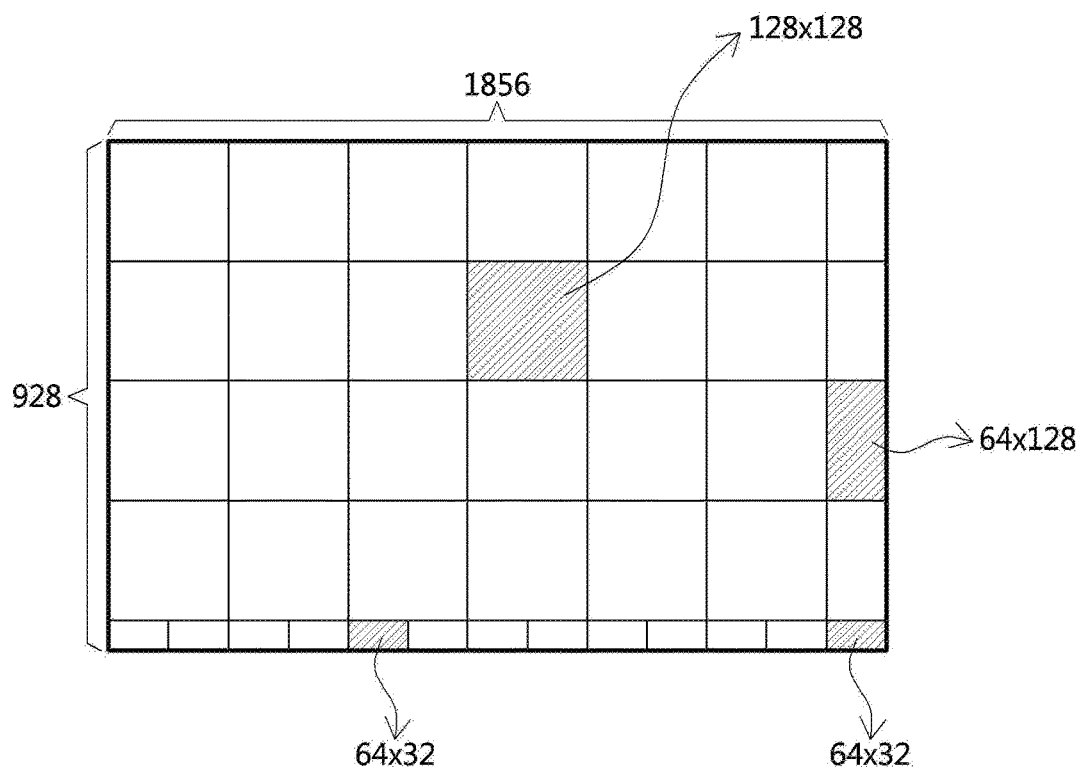
FIG. 10 is a second example diagram illustrating a basic encoding block adjustment method according to an embodiment of the present invention.

FIG. 10 is a second example diagram illustrating a basic encoding block adjustment method according to an embodiment of the present invention.

Referring to FIG. 10, when the size of the picture and the size of the basic encoding block are the same as those shown in FIG. 9, splits based on multiple trees such as a quad tree and a boundary tree are supported, and the minimum block is 8×8, the basic encoding block may borrow a square block such as 64×64, 32×32, 16×16, and 8×8 and a rectangular block such as 128×64, 64×128, 64×32, 32×64, 32×16, 16×32, 16×8, and 8×16 through the block split unit. Here, even a block with horizontal and vertical ratios exceeding two times may be borrowed through the quad tree and the binary tree. However, for convenience of description, the block may be excluded from the candidate group, but the present invention is not limited thereto.

Since the picture has a horizontal length of 1856 and the basic encoding block has a horizontal length of 128, a length of 64 may be left on a right boundary of the picture. Here, since the block located on the right boundary of the picture may have a size of 64×128, the basic encoding block may borrow a 64×128 block among the candidate blocks supported by the block split unit. Here, the borrowed block may be a maximum-sized block or a minimum number of blocks with respect to 64×128 among the candidate blocks. When a 64×128 block is borrowed, 64×128 may be composed of one 64×128 block.

Also, since the picture has a vertical length of 928 and the basic encoding block has a vertical length of 128, a length of 32 may be left on a lower boundary of the picture. Here, since the block located on the lower boundary of the picture may have a size of 128×32, the basic encoding block may borrow a 64×32 block among the candidate blocks supported by the block split unit. Here, the borrowed block may be a maximum-sized block or a minimum number of blocks with respect to 128×32 among the candidate blocks. When the 64×32 block is borrowed, 128×32 may be composed of two 64×32 blocks.

Since the block located on the lower right boundary of the picture has a size of 64×32, the basic encoding block may borrow a 64×32 block among the candidate blocks supported by the block split unit. Here, the borrowed block may be a maximum-sized block or a minimum number of blocks with respect to 64×32 among the candidate blocks. When the 64×32 block is borrowed, 64×32 may be composed of one 64×32 block.

In other words, one basic encoding block (with a size of 128×128) may be composed of one adjusted basic encoding block (with a size of 64×128) on the right boundary of the image, two adjusted basic encoding blocks 64×32 on the lower boundary of the image, or two adjusted basic encoding blocks 64×32 on the lower right boundary of the image.

Referring to FIG. 10, the borrowed block may be determined (by performing a primary process) while the horizontal or vertical length of the block is maintained appropriately for the remaining horizontal or vertical length. In other words, on the right side of the picture, a 64×128 block is determined to be borrowed among 64×128, 64×64, and 64×32 blocks, which are represented using the remaining horizontal length of 64. On the lower side of the picture, a 64×32 block is determined to be borrowed among 64×32, 32×32, and 16×32 blocks, which are represented using the remaining vertical length of 32.

However, the borrowed block may be determined by performing a secondary or higher process when a block appropriate for the remaining horizontal or vertical length is not present among the blocks supported by the block split unit. This will be described in detail below with reference to FIG. 10.

Figure 11A:
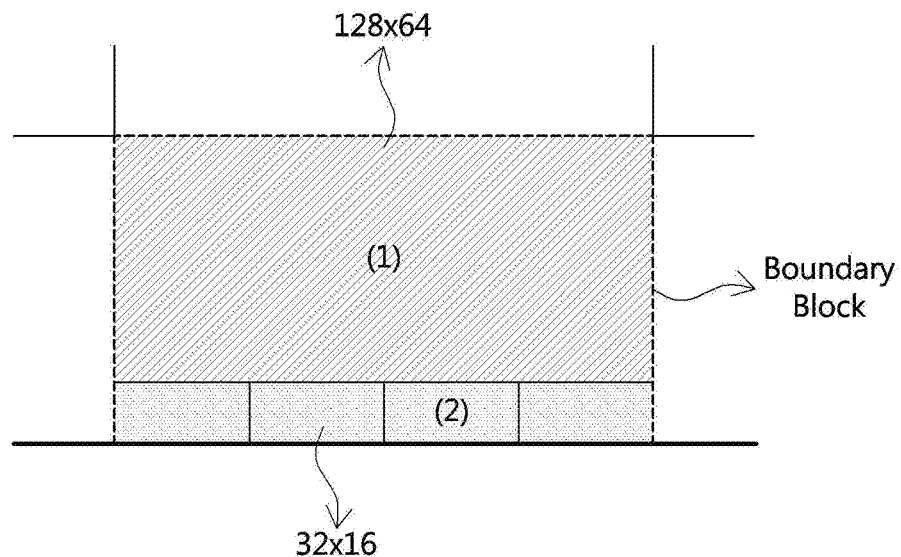
FIGS. 11A and 11B are views showing a boundary block for illustrating a basic encoding block adjustment method according to an embodiment of the present invention.
Figure 11B:
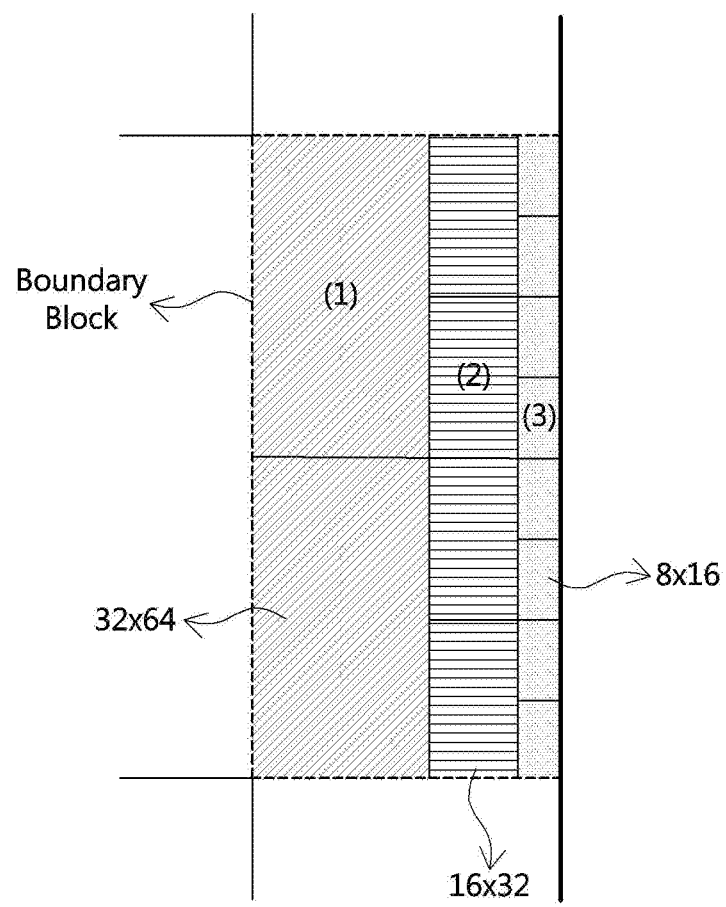

FIGS. 11A and 11B are views showing a boundary block for illustrating a basic encoding block adjustment method according to an embodiment of the present invention.

Referring to FIG. 11A, it is assumed that a 128×80 block is present on a lower boundary of the picture because the basic encoding block has a size of 128×128 and the size of the picture is not an integral mixture of the size of the basic encoding block. Here, the 128×80 block may be referred to as a boundary block.

The basic encoding block may borrow a 128×64 block, which is one of the 128×64, 64×64, and 32×64 blocks and is similar to the size of 128×80, from among the candidate blocks supported by the block split unit, and a 128×16 block may be left.

Here, the basic encoding block may additionally borrow a 32×16 block, which is one of the 32×16, 16×16, and 8×16 blocks and is similar to the size of 128×16, from among the candidate blocks supported by the block split unit.

Referring to FIG. 11B, it is assumed that a 56×128 block is present on a right boundary of the picture because the basic encoding block has a size of 128×128 and the size of the picture is not an integral mixture of the size of the basic encoding block.

The basic encoding block may borrow a 32×64 block, which is one of the 32×64, 32×32, and 32×16 blocks and is similar to the size of 56×128, from among the candidate blocks supported by the block split unit, and a 24×128 block may be left.

Here, the basic encoding block may additionally borrow a 16×32 block, which is one of the 16×32, 16×16, and 16×8 blocks and is similar to the size of 24×128, from among the candidate blocks supported by the block split unit, and an 8×128 block may be left.

Last, the basic encoding block may borrow an 8×16 block, which is similar to the size of 8×128, from among the candidate blocks supported by the block split unit.

In other words, FIG. 11A shows an example in which one basic encoding block (with a size of 128×128) may be composed of one basic encoding block (with a size of 128×64) that is first adjusted and four basic encoding blocks (with a size of 32×16) that are second adjusted, and FIG. 11B shows an example in which one basic encoding block (with a size of 128×128) may be composed of two basic encoding blocks (with a size of 32×64) that are first adjusted, four basic encoding blocks (with a size of 16×32) that are second adjusted, and eight basic encoding blocks (with a size of 8×16) that are third adjusted.

FIG. 12 is a flowchart showing a method of encoding an image by adjusting a basic encoding block according to an embodiment of the present invention.

Referring to FIG. 12, the image encoding apparatus for adjusting a basic encoding block according to an embodiment of the present invention may set size information of a picture and size information and block split information of a basic encoding block (S1210) and may partition the picture into basic encoding blocks or basic encoding blocks reset based on the block split information depending on a block location (S1220). Also, the image encoding apparatus may encode the basic encoding block in a reset block scan order (S1230) and transmit a bitstream corresponding to encoding to an image decoding apparatus.

Also, the image decoding apparatus according to an embodiment of the present invention may operate corresponding to the above-described image encoding apparatus. In other words, the image decoding apparatus may restore the size information of the picture and the size information and the block split information of the basic encoding block on the basis of the bitstream received from the image encoding apparatus and may partition the picture into basic encoding blocks or basic encoding blocks reset based on the block split information. Also, the image decoding apparatus may decode the basic encoding block in the reset block scan order.

Here, the block split information may refer to split information regarding a block acquirable between a maximum block size and a minimum block size. In detail, the block split information may refer to information (e.g., tree information, tree-specific maximum and minimum size information, maximum split depth information, and a block form limitation information <horizontal/vertical ratio information>, etc., which are supported by a color component <Y/Cb/Cr>, an image type <I/P/B>, and the like) that is explicitly generated in association with block split settings capable of affecting acquisition of blocks having various sizes and forms through the block acquisition unit and may include implicit information such as a split order, a split rule, and the like that are predetermined by the encoder/decoder.

Also, when the picture is not an integral multiple of the basis encoding block, the picture is not partitioned into the basic encoding blocks on a right or lower boundary of the picture. Thus, the partitioning may be performed after a basic encoding block having a block size supported according to the block split settings supported by the block split unit is reset. In other words, one basic encoding block located on a boundary of the picture may be composed of at least one reset basic encoding block, and then the partitioning may be performed.

Also, since the boundary of the picture may be composed of one or more basic encoding blocks, some scan orders such as z-scan may be applied to the basic encoding block located on the boundary of the picture. For example, in the scan order shown in FIG. 11A, a 128×64 block may be scanned first, and then four 32×16 blocks located at a lower side may be scanned from left to right.

2. Image Size Adjustment Method

An image size adjustment method is a method of expanding the size of an image when the size of a picture is not an integral multiple of the size of the basic encoding block.

Figure 13A:
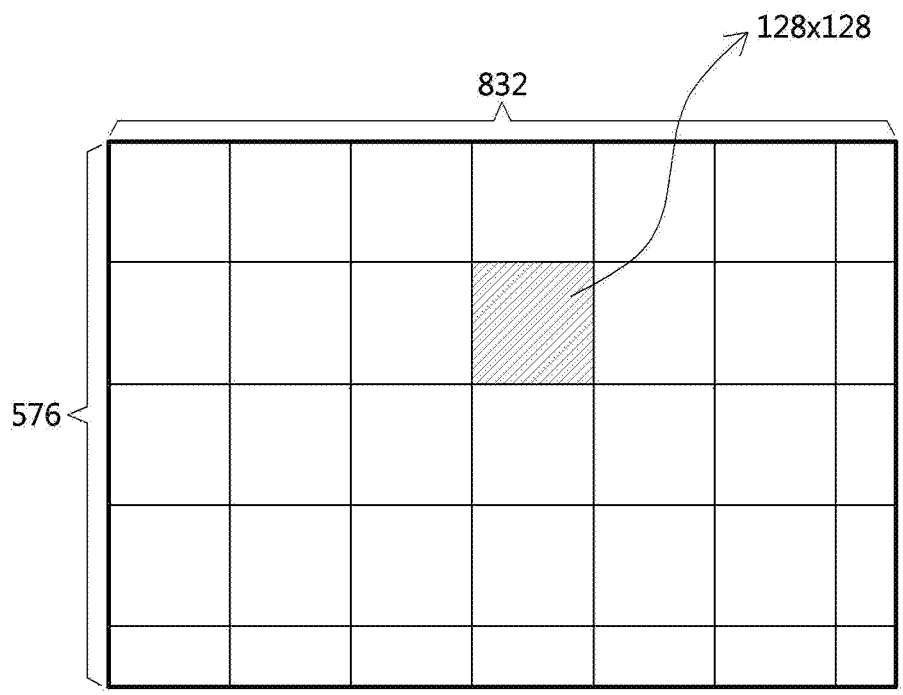
FIGS. 13A and 13B show a first example diagram illustrating an image size adjustment method according to an embodiment of the present invention.
Figure 13B:
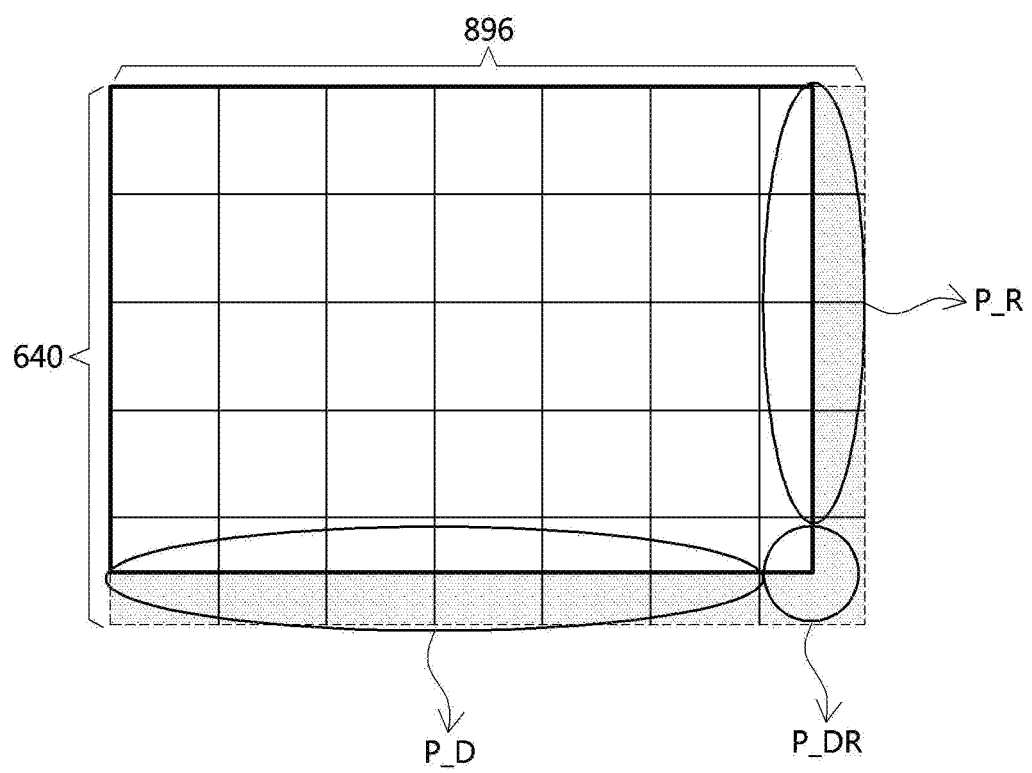

FIGS. 13A and 13B show a first example diagram illustrating an image size adjustment method according to an embodiment of the present invention.

Referring to FIG. 13A, when the picture has a size of 832×576 and the basic encoding block has a size of 128×128, a length of 64 may be left on the right boundary and the lower boundary of the picture. In this case, the size of the picture may be horizontally and vertically expanded or adjusted by a length of 64.

Referring to FIG. 13b, the expanded size of the picture may have a size of 896×640, and the expanded picture may be partitioned into 35 128×128 basic encoding blocks.

The image size adjustment method will be described in more detail. The picture expansion may be performed such that the expanded size of the picture is the minimum integral multiple of the basic encoding block. Referring to FIG. 11A, since the horizontal length of the picture is 832, a length that is greater than the horizontal length of the picture and that is an integral multiple of the basic encoding block may include 896, 1024, and the like. Among the lengths, the minimum length is 986, and thus the horizontal length of the picture may be expanded to 896. Also, since the vertical length of the picture is 576, a length that is greater than the vertical length of the picture and that is an integral multiple of the basic encoding block may include 640, 768, and the like. Among the lengths, the minimum length is 640, and thus the vertical length of the picture may be expanded to 640. However, a criterion for the picture expansion may be differently set, and thus a description thereof will be omitted.

Here, an expanded region may be filled with a predetermined pixel value or with a pixel value located on a boundary of the expanded region.

In an embodiment, when the expanded region is filled with a predetermined pixel value, the predetermined pixel value may be one value included in a pixel value range determined by a bit depth or one value included in a range of pixel values constituting an actual image.

Here, the pixel value range determined by the bit depth may be from the minimum value of 0 to the maximum value $2n-1$ (here, n is the number of bits). For example, when a median is used as the predetermined pixel value in the pixel value range determined by the bit depth and the number of bits is 10, the predetermined pixel value may be 512 in the range from 0 to 1023. Also, in a range of pixel values constituting an actual image, a median may be used as the predetermined pixel value. For example, when the range of pixel values constituting an actual image range from the minimum value x to the maximum value y, a median in the range from x to y may be used as the predetermined pixel value. A method of selecting the above-described predetermined pixel value is one example, and thus the present invention is not limited thereto.

In another embodiment, when the expanded region is filled with the pixel values located on the boundary of the region, pixels located on a right boundary and a lower boundary of the image may be used. In other words, a region expanded from the right boundary of the image may be filled with pixels obtained by horizontally copying the pixels located on the right boundary of the image, and a region expanded from the lower boundary of the image may be filled with pixels obtained by vertically copying the pixels located on the lower boundary of the image. A region expanded from the lower right boundary of the image may be filled with pixels obtained by diagonally copying the pixels located on the lower right boundary of the image.

Also, for some images, such as a 360 degree image, data of the expanded region may be acquired from a region having continuity (or correlation) in a three-dimensional (3D) space (e.g., a sphere). For example, when a region expanded to the right of the image is filled in a protection format such as Equirectangular Projection, the expanded region may be filled with pixel values located to the left of the image. Due to settings for placing a 3D image in a two-dimensional (2D) space, this is located on an image boundary (i.e., in the 2D space), but may actually be an example in which data with correlation is present in the image.

The data filling method may correspond to a method of expanding an image, except for a 360 degree image, by filling an expanded region with unnecessary data and then performing encoding/decoding.

Figure 14:
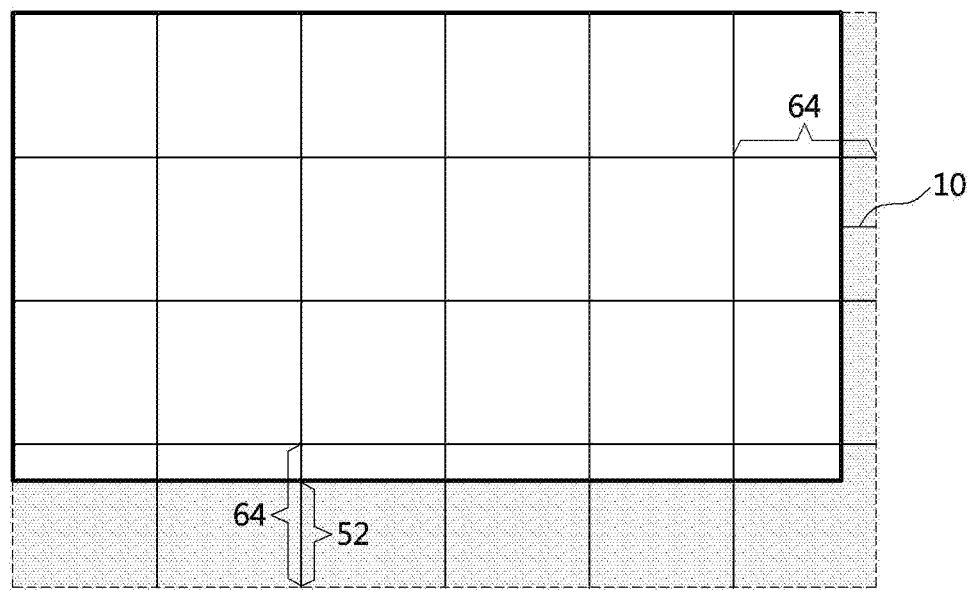
FIG. 14 is a second example diagram illustrating an image size adjustment method according to an embodiment of the present invention.

FIG. 14 is a second example diagram illustrating an image size adjustment method according to an embodiment of the present invention.

The expanded region of the image may be determined depending on the size of the image and the size of the basic encoding block, and a ratio of the expanded region to the basic encoding block located on the boundary of the image is smaller than or larger than a ratio of a region including an actual image to the basic encoding block.

Referring to FIG. 14, when the size of the basic encoding block is 64×64 and the size of the picture is not an integral multiple of the size of the basic encoding block, the picture may be expanded from the right boundary by a horizontal length of 10 and from the lower boundary by a horizontal length of 52. In other words, the region expanded from the right boundary may be smaller than a region of the existing image located in the basic encoding block, and the region expanded from the lower boundary may be larger than a region of the existing image located in the basic encoding block.

Thus, the basic encoding block including the right boundary of the picture has a relative small expanded region and thus may have a small reduction in encoding/decoding performance while the basic encoding block including the lower boundary of the picture has a relative large expanded region and thus may have a large reduction in encoding/decoding performance.

In order to solve this problem, a method of borrowing one of the blocks supported by the block split unit or a method of minimizing expanded data may be used. The method of borrowing one of the blocks supported by the block split unit has been described above. Therefore, the method of minimizing the expanded data will be described below.

In an embodiment, it is assumed that a split based on a single tree such as a quad tree may be supported for the basic encoding block, the minimum block may be 8×8, and 64×64, 32×32, 16×16, and 8×8 square blocks may be borrowed through the block split unit. It is also assumed that the boundary portion of the picture may be extended in accordance with one of the blocks according to the encoding/decoding settings and thus the basic encoding block may be (re)set or (re)adjusted. Here, the encoding/decoding settings may be the same as those of a minimum number of blocks, a block having a smaller difference in size, and the like among blocks with sizes greater than the left size. However, the present invention is not limited thereto.

Referring to FIG. 14, a length of 54 may be left on the right boundary of the picture, and a block located on the right boundary may have a size of 54×64. Here, the block located on the right boundary may be expanded from the right boundary by a length of 10 in order to borrow a 64×64 block, which has a small difference in size from the block located on the right boundary, from among the candidate blocks capable of being supported by the block split unit. Accordingly, the expanded region of 64×64 may be composed of one adjusted basic encoding 64×64 block, but the size of the adjusted basic encoding block is the same of the basic encoding block before the adjustment. Accordingly, this case may be the same as a case in which the size of the picture is expanded in accordance with an integral multiple of the size of the basic encoding block.

A length of 12 may be left on the lower boundary of the picture, and a block located on the lower boundary may have a size of 64×12. Here, the block located on the lower boundary may be expanded from the lower boundary by a length of 4 in order to borrow a 16×16 block, which has a small difference in size from the block located on the lower boundary, from among the candidate blocks capable of being supported by the block split unit. Accordingly, the expanded region (with a size of 64×16) may be composed of four adjusted basic encoding blocks (with a size of 16×16).

In another embodiment, it is assumed that splits based on multiple trees such as a quad tree and a binary tree are supported for the basic encoding block and rectangular blocks such as 64×32, 32×64, 64×16, 16×64, 64×8, 8×64, 32×16, 16×32, 32×8, 8×32, 16×8, and 8×16 as well as 64×64, 32×32, 16×16, and 8×8 square blocks may be borrowed through the block split unit.

A length of 54 may be left on the right boundary of the picture, and a block located on the right boundary may have a size of 54×64. Here, the block located on the right boundary may be expanded from the right boundary by a length of 10 in order to borrow a 64×64 block, which has the minimum difference, from among candidate blocks having a horizontal length of 64 (64×64, 64×32, 64×16, and 64×8 blocks), which has a small difference from the horizontal length of the block located on the right boundary.

A length of 12 may be left on the lower boundary of the picture, and a block located on the lower boundary may have a size of 64×12. Here, the block located on the lower boundary may be expanded from the lower boundary by a length of 4 in order to borrow a 64×16 block, which has the minimum difference, from among candidate blocks having a vertical length of 16 (64×16, 32×16, 16×16, and 8×16 blocks), which has a small difference in size from the block located on the right boundary. Accordingly, the expanded region (with a size of 64×16) may be composed of one adjusted basic encoding block (with a size of 64×16).

In other words, the picture may be expanded in order to borrow a candidate block with a small difference in size on the basis of a remaining length according to a difference between the integral multiple of the basic encoding block and the size of the picture, and the basic encoding block may be (re)set or (re)adjusted depending on the size of the candidate block having a difference in size.

The image size adjustment method may be similar to the basic encoding block adjustment method in that the basic encoding block can be adjusted, but is different from the basic encoding block adjustment method in that the basic encoding block need not be adjusted by expanding the size of the image and only the first adjustment can be performed although the basic encoding block is adjusted.

Also, the basic encoding block adjustment method may perform encoding/decoding on the existing image data and may not require generation of information (size and split information of a readjusted block, etc.) regarding the basic encoding block of the picture. In other words, a process of encoding/decoding unnecessary data may not be required. However, in the basic encoding block adjustment method, a variable basic encoding block is configured on the boundary of the picture. Thus, exceptional processing is required. As a result, the uniformity of the encoding/decoding structure deteriorates.

On the other hand, the image size adjustment method may maintain the uniformity of the encoding/decoding structure when the picture is expanded to an integral multiple of the basic encoding block. However, unnecessary data generated during the expanding process should be encoded/decoded, which may cause a reduction in encoding performance.

Figure 15:
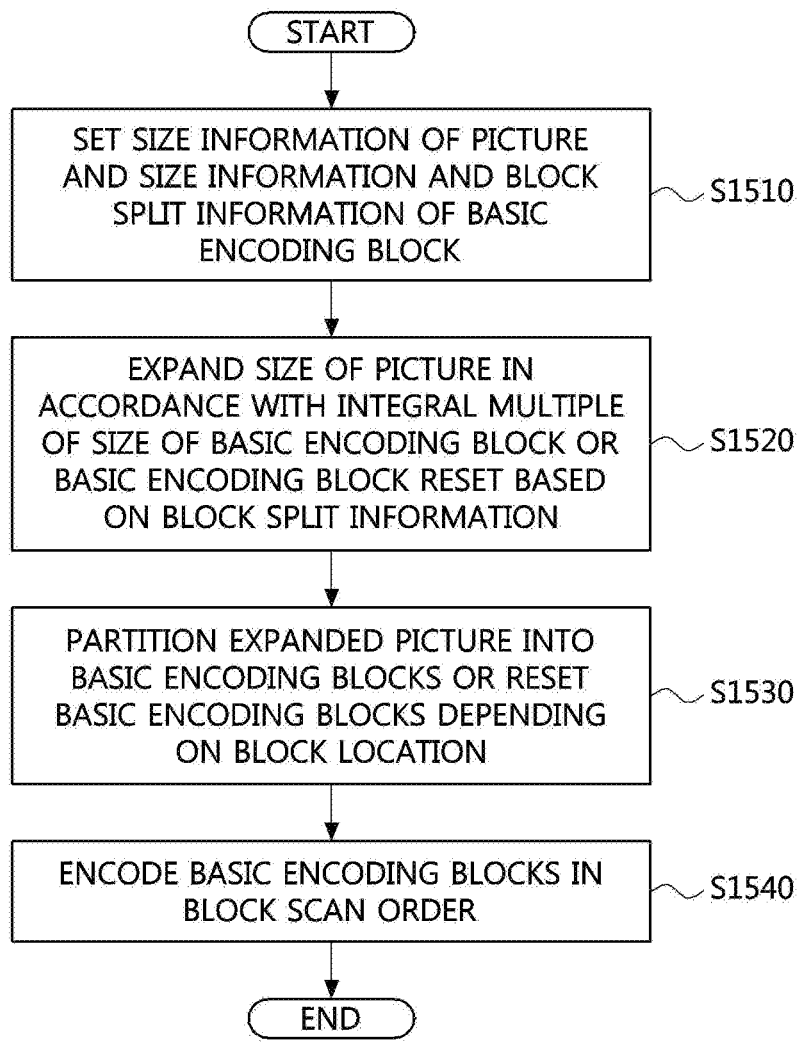
FIG. 15 is a flowchart showing a method of encoding an image by adjusting the size of the image according to an embodiment of the present invention.

FIG. 15 is a flowchart showing a method of encoding an image by adjusting the size of the image according to an embodiment of the present invention.

Referring to FIG. 15, the image encoding apparatus for adjusting an image size according to an embodiment of the present invention may set size information of a picture and size information and block split information of a basic encoding block (S1510) and may expand the size of the picture in accordance with a reset basic encoding block on the basis of the block split information or the integral multiple of the basic encoding block (S1520). Also, the image encoding apparatus may partition the expanded picture into basic encoding blocks or reset basic encoding blocks depending on a block location (S1530), may encode the basic encoding blocks in a block scan order (S1540), and may transmit a bitstream corresponding to encoding to an image decoding apparatus.

Also, the image decoding apparatus according to an embodiment of the present invention may operate corresponding to the above-described image encoding apparatus. In other words, the image decoding apparatus may restore the size information of the picture and the size information and the block split information of the basic encoding block on the basis of the bitstream received from the image encoding apparatus and may expand the size of the picture in accordance with the reset basic encoding block on the basis of the block split information or the integral multiple of the size of the basic encoding block. Also, the image decoding apparatus may partition the expanded picture into the basic encoding blocks or the reset basic encoding blocks and may decode the basic encoding blocks in the block scan order.

Here, the expansion of the picture may be performed in some directions, such as to the right of or downward from the picture, in accordance with the integral multiple of the basic encoding block or in accordance with a block size supported according to block split settings supported by the block split unit.

Also, the scan order has been described as being reset according to the number of basic encoding blocks. However, the scan order may not be changed because the number of blocks is not changed, that is, one block, even though the basic encoding block is reset.

3. Adaptive Image Data Processing Method

The adaptive image data processing method is a method of expanding the size of the image and adaptively processing image encoding/decoding data of the expanded region on the basis of the region of the existing image when the size of the picture is not an integral multiple of the size of the basic encoding block. In other words, the adaptive image data processing method is a method of explicitly processing the image encoding/decoding data based on the region of the existing image and implicitly processing image encoding/decoding data based on the expanded region.

FIGS. 16A to 16D show an example diagram for illustrating an adaptive image data processing method according to an embodiment of the present invention.

Figure 16A:
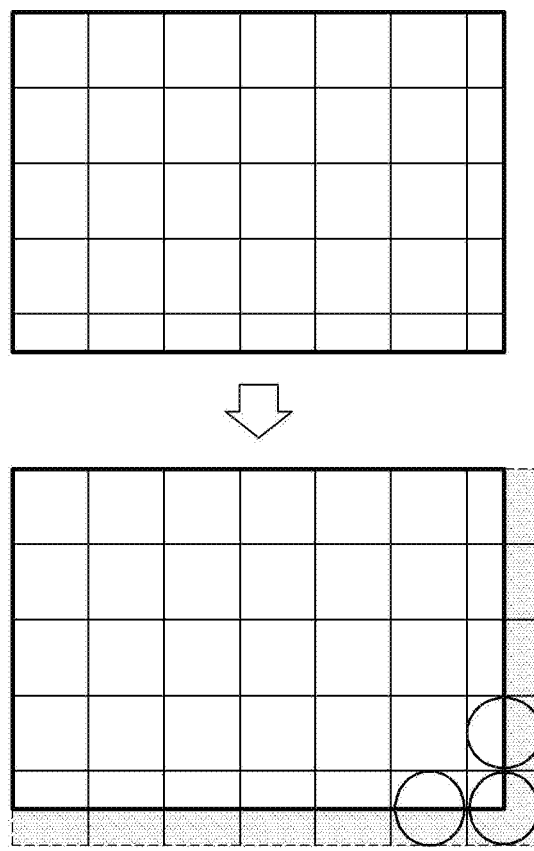
FIGS. 16A to 16D show an example diagram for illustrating an adaptive image data processing method according to an embodiment of the present invention.

Referring to FIG. 16A, it is assumed that the picture has a size of 392×272 and the basic encoding block has a size of 64×64. Thus, the picture may have a remaining horizontal length of 8 on the right boundary and a remaining vertical length of 16 on the lower boundary and may be horizontally expanded by 56 and vertically expanded by 48. The expanded picture may have a size of 448×320 and may be an integral multiple of the size of the basic encoding block.

A method of explicitly and implicitly processing split information generated to acquire an optical split form from the basic encoding block according to the split settings will be described below.

For convenience of description, each process to be described below may be represented with an ordering number in parentheses of the block, and a number following "-" along with the ordering number in the parentheses may refer to the location of a block in which a corresponding process is performed. Here, the number denoting the location of the block may include indices 1, 2, 3, and 4 allocated in a z scan order (an order of upper left, upper right, lower left, and lower right) when four blocks are acquired according to a quad tree-based split and may include indices 1 and 2 allocated in a vertical or horizontal order when two blocks are acquired according to a binary tree-based split. For example, when four blocks are acquired according to the quad tree-based split, (2-1) may refer to a second process and may denote that the process is performed by an upper left block among the four blocks.

Figure 16B:
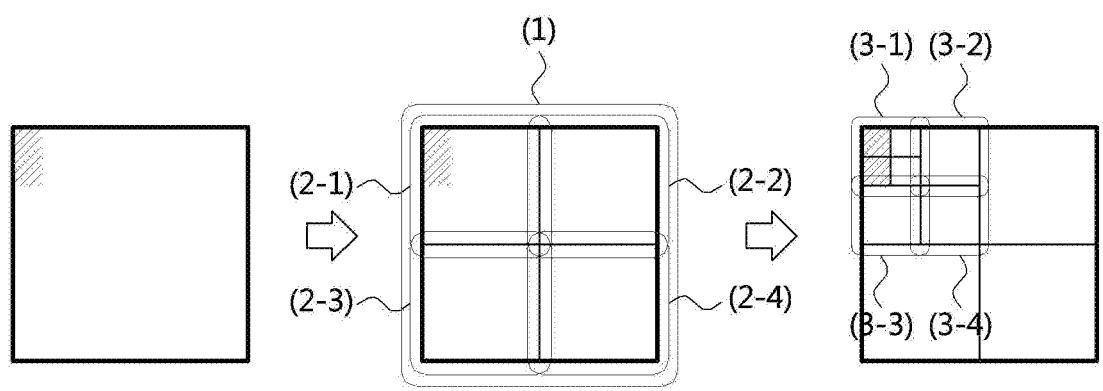

Referring to FIG. 16B, an actual image may be a hatched region (with a size of 8×16) on the upper left of the block, and the remaining region other than the hatched region in the 64×64 block may be an expanded region and may refer to a padded region when the hatched region is filled through outer pixel padding. Here, it is assumed that a split based on a single tree such as a quad tree may be supported for the basic encoding block, and 64×64, 32×32, 16×16, and 8×8 blocks may be acquired through the block split unit when the minimum block has a size of 8×8.

The actual image may be composed of two 8×8 blocks among the blocks capable of being supported by the block split unit, and block split information may be adaptively configured according to the following process.

A first process is to acquire candidates by splitting a 64×64 block (1). Here, 64×64 and 32×32 blocks may be acquirable, but an unconditional split should be performed in order to acquire a block including only actual image data. Thus, the 64×64 block, which includes the padded data, may be excluded from the candidates. Accordingly, only 32×32 blocks may be candidates. Here, the split information may indicate 1 or 0 depending on the presence of the split, but one 32×32 block is a candidate. Thus, the unconditional split should be performed. Accordingly, the split information may be explicitly or implicitly processed depending on the value.

A second process is to acquire candidates by splitting an upper left block (2-1), an upper right block (2-2), a lower left block (2-3), and a lower right block (2-4), which have a size of 32×32. Here, 32×32 and 16×16 blocks are acquirable from each block. However, for the upper left block (2-1), only the 16×16 block may be a candidate for the same reason as in the first process. Also, for the upper right block (2-2), the lower left block (2-3), and the lower right block (2-4), only the 32×32 block may be a candidate, because only a padded region is included and thus an additional split is meaningless. Accordingly, since only one candidate is present for each block, the split information may be implicitly processed.

A third process is to acquire candidates by splitting an upper left block (3-1), an upper right block (3-2), a lower left block (3-3), and a lower right block (3-4), which have a size of 16×16. Here, 16×16 and 8×8 blocks are acquirable from each block. However, for the upper left block (3-1), only the 8×8 block may be a candidate for the same reason as in the first process and the second process. For the upper right block (3-2), the lower left block (3-3), and the lower right block (3-4), only the 16×16 block may be a candidate for the same reason as the upper right block (2-2), the lower left block (2-3), and the lower right block (2-4) of the second process. Accordingly, since only one candidate is present for each block, the split information may be implicitly processed.

A fourth process is to acquire four 8×8 blocks by splitting the upper left block (301) of the third process. A block including actual image data, which has a size of 8×16, is greater than blocks obtained by splitting the upper left block (3-1), which have a size of 8×8, but may be composed of upper left and lower left 8×8 blocks. Thus, an additional split may not be performed.

The split information generated during the above first to fourth processes may be expressed as (8×8): 1-1-1-0-0-0-0-0-0 and may indicate information regarding the first process, the upper left block of the second process, the upper left block of the third process, the upper right block of the third process, the lower left block of the third process, the lower right block of the third process, the upper right block of the second process, the lower left block of the second process, and the lower right block of the second process in sequence. Here, 1 and 0 of the split information may be a syntax element indicating the presence of the split according to the quad tree-based split.

However, the split information generated during the above first to fourth processes may be implicitly processed. Accordingly, when adaptive encoding/decoding data is processed on the basis of the actual image data, there is no process of explicitly processing the data, and thus the split information may not be present. This may correspond to a case in which an optimal split form may be checked without generation and restoration of the split information.

Figure 16C:
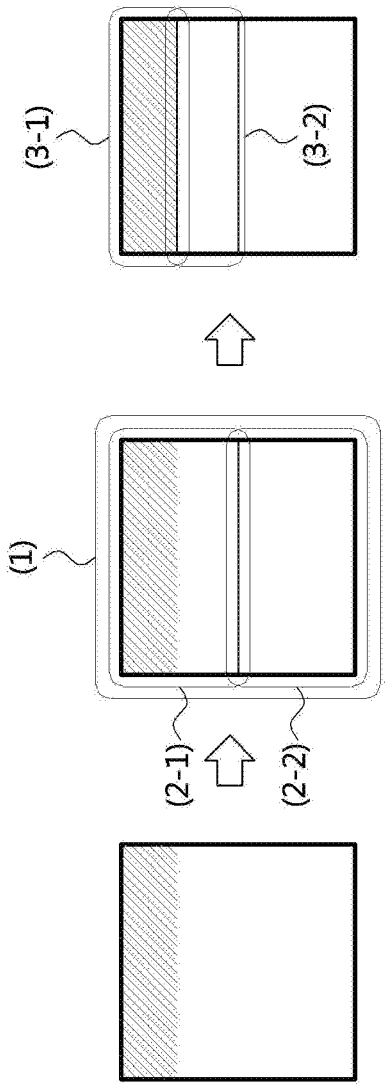

Referring to FIG. 16C, an actual image may be a hatched region (with a size of 64×16) on the upper of the block, and the remaining region other than the hatched region in the 64×64 block may be an expanded region and may refer to a padded region when the hatched region is filled through outer pixel padding. Here, it is assumed that a split based on a single tree such as a binary tree may be supported for the basic encoding block, and 64×64, 64×32, 32×64, 64×16, 16×64, 32×32, 64×8, 8×64, 32×16, and 16×32 blocks may be acquired through the block split unit when the minimum block has a side length of 8 and the maximum split depth is 3. Here, the block split information may be adaptively configured according to the following process.

A first process is to acquire candidates by splitting a 64×64 block (1). Here, a split depth may increase from 0 to 1, and 64×64, 64×32, and 32×64 blocks may be acquirable, but an unconditional split should be performed in order to acquire a block including only actual image data. Thus, the 64×64 block, which includes the padded data, may be excluded from the candidates. Also, the 32×64 block may be excluded from the candidates because an additional split, such as a horizontal split of each block, is required in subsequent steps in order to acquire a block including only the actual image data. In other words, since the number of splits increases, the 32×64 block may be excluded from the candidates. Accordingly, only the 64×32 block may be included in the candidates, and only one candidate is present for each block. Thus, the split information may be implicitly processed.

A second process is to acquire candidates by splitting an upper block (2-1) and a lower block (2-2), which have a size of 64×32. Here, the split depth may increase from 1 to 2, and 64×32, 64×16, and 32×32 blocks are acquirable from each block. However, for the upper block (2-1), only the 64×16 block may be a candidate because the 64×32 and 32×32 blocks may be excluded from the candidates for the same reason as in the first process. Also, for the lower block (2-2), only the 64×32 block may be a candidate because only a padded region is included and thus an additional split is meaningless. Accordingly, since only one candidate is present for each block, the split information may be implicitly processed.

A third process is to acquire candidates by splitting an upper block (3-1) and a lower block (3-2), which have a size of 64×16. Here, the split depth may increase from 2 to 3, and 64×16, 64×8, and 32×16 blocks are acquirable from each block. However, for the upper block (3-1), one of the 64×16, 64×8, and 32×16 blocks may be determined as an optimal split form because a block including only actual image data is acquired. Also, for the lower block (3-2), only the 64×16 block may be a candidate because only a padded region is included and thus an additional split is meaningless.

A fourth process is to acquire candidates by splitting the upper block (3-1) of the third process. However, the optimal split form of the upper block (3-1) of the third process is determined, and the side length, the split depth, and the like reach the minimum block conditions. Thus, an additional split may not be performed.

The split information generated during the above first to fourth processes may be expressed as (64×16): 1-0-1-0-0-0-0 when the 64×16 block is determined as the optimal split form, (64×8): 1-0-1-0-1-0-0-0 when the 64×8 block is determined as the optimal split form, and (32×16): 1-0-1-0-1-1-0-0 when the 32×16 block is determined as the optimal split form. Here, the split information may be informa-tion regarding the first process, the upper block of the second process, the upper block of the third process, the lower block of the third process, and the lower block of the second process in sequence.

In detail, the split information may include two syntax elements indicating split presence and a split direction in the first process, two syntax elements indicating split presence and a split direction in the upper block of the second process, two syntax elements indicating split presence and a split direction in the upper block of the third process, one syntax element indicating split presence in the lower block of the third process, and one syntax element indicating split presence in the lower block of the second process. When the syntax element regarding the presence of the split is 0, a split is not performed. When the syntax element regarding the presence of the split is 1, a split is performed. When the syntax element regarding the split direction is 0, the split direction may indicate a horizontal direction. When the syntax element regarding the split direction is 1, the split direction may indicate a vertical direction.

However, among the split information generated during the above first to fourth processes, the upper block of the third process may be explicitly processed, and the other blocks may be implicitly processed. Accordingly, when adaptive encoding/decoding data is processed on the basis of the actual image data, the split information may be expressed as (64×16): 0 when the 64×16 block is determined as the optimal split form, (64×8): 1-0 when the 64×8 block is determined as the optimal split form, and (32×16): 1-1 when the 32×16 block is determined as the optimal split form.

In other words, by using the split information that is generated in the upper block of the third process and explicitly processed, other than the split information that is implicitly processed, the optimal split form may be checked in the basic encoding block. However, a case in which some of the split information is implicitly processed has been described above, but when 64×16 satisfies the minimum block conditions according to the block split settings, all the split information may be implicitly processed.

Figure 16D:
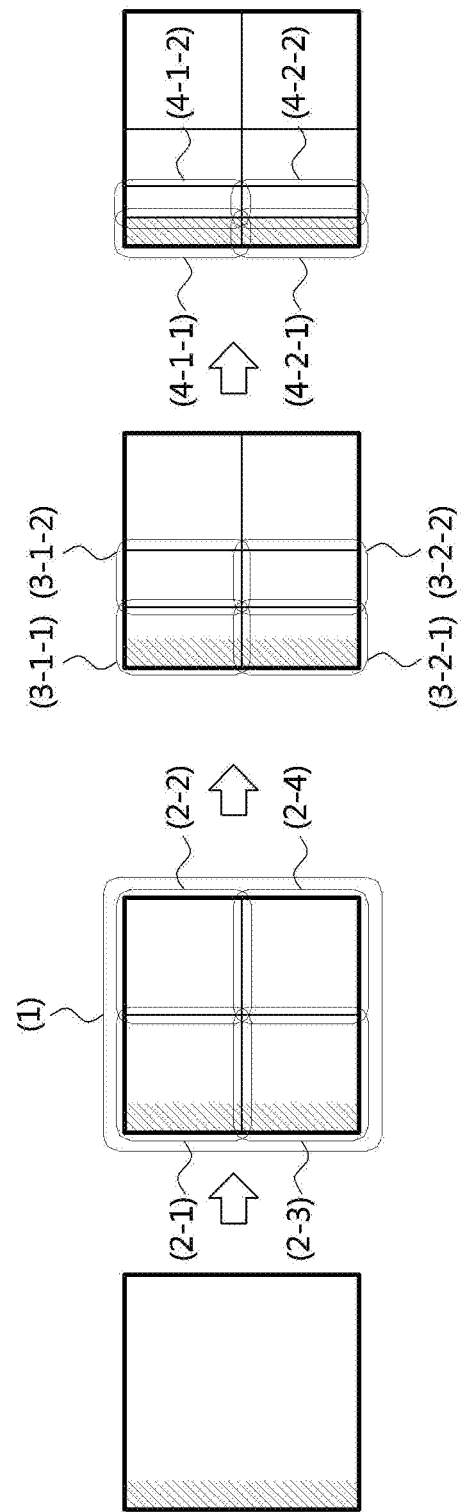

Referring to FIG. 16D, an actual image may be a hatched region (with a size of 8×64) to the left of the block, and the remaining region other than the hatched region in the 64×64 block may be an expanded region and may refer to a padded region when the hatched region is filled through outer pixel padding. Here, splits based on multiple trees such as a quad tree and a binary tree may be supported for the basic encoding block. For split settings of the quad tree, the maximum block may have the same size, which is 64×64, as the size of the basic encoding block, and the minimum block may have a size of 16×16. For split settings of the binary tree, the maximum block may have a size of 32×32, the minimum block may have a side length of 4, and the maximum split depth may be 3. In addition, it is assumed that the tree splits may be performed according to priorities (e.g., the quad tree-based split takes precedence over the binary tree-based split) when ranges generated by the tree splits overlap each other and that 64×64, 32×32, 32×16, 16×32, 32×8, 8×32, 16×16, 32×4, 4×32, 16×8, and 8×16 blocks may be acquired through the block split unit. Here, the block split information may be adaptively configured according to the following process.

A first process is to acquire candidates by splitting a 64×64 block (1). Here, 64×64 and 32×32 blocks may be acquirable, but an unconditional split should be performed in order to acquire a block including only actual image data. Thus, the 64×64 block, which includes the padded data, may be excluded from the candidates. In the existing case, split information such as information regarding the presence of the quad tree-based split, the presence of the binary tree-based split, and the direction of the binary tree-based split may be generated. However, according to an embodiment, only one candidate according to the quad tree-based split may be supported, and thus the split information may be implicitly processed.

A second process is to acquire candidates by splitting an upper left block (2-1), an upper right block (2-2), a lower left block (2-3), and a lower right block (2-4), which have a size of 32×32. Here, 32×32 and 16×16 blocks may be acquirable from each block when the quad tree-based split is performed, 32×16 and 16×32 blocks may be acquirable from each block, and the split depth increases from 0 to 1 when the binary tree-based split is performed.

For the upper lift block (2-1) and the lower left block (2-3), the 32×32 block among the candidate blocks should be unconditionally split and thus may be excluded from a group of the candidates, and also the 32×16 and 16×16 blocks may require an additional split such as a vertical split of each block in subsequent steps in order to acquire a block including actual image data and may be excluded from the group of the candidates. Here, the size of the block including the actual image data may be 8×64. However, the quad tree-based split is performed in the first process, and thus a size of 8×32 may be regarded as the size of the block including the actual image data. Accordingly, only one 16×32 block may be present as a candidate for each block. However, the 16×32 block requires an additional split in subsequent steps, but a smaller number of splits are performed to reach the block including the actual image data compared to the other candidate blocks. Thus, the 16×32 block may be an optimal candidate.

According to split information for acquiring the optimal candidate (i.e., the 16×32 block), a quad tree-based split having a higher priority among the splits based on multiple trees is not performed, and a binary tree-based split having the next higher priority is performed. The split may have a vertical direction. Here, the split information includes split direction information and split presence information in the binary tree-based split. However, when the quad tree-based split and the binary tree-based split overlap each other, the quad tree-based split having a higher priority has a 32×32 block as a candidate, and thus the binary tree may not require the 32×32 block to be supported as a candidate. In other words, when the quad tree-based split and the binary tree-based split overlap each other, the split presence information for the binary tree-based split may be excluded from the split information, and only the split direction information may be included in the split information. Accordingly, since only one optimal candidate is present, the split information may be implicitly processed.

The upper right block (2-2) and the lower right block (2-4) include only a padded region. Thus, an additional split is meaningless, and only the 32×32 block may be a candidate. Accordingly, since only one candidate is present, the split information may be implicitly processed.

The third process is to acquire candidates by splitting a left block (3-1-1) and a right block (3-1-2), which has a size of 16×32 and which is acquired from the upper left block (2-1) and by splitting a left block (3-2-1) and a right block (3-2-2) which has a size of 16×32 and which is acquired from the lower left block (2-3). Here, the split depth may increase from 1 to 2, and the 16×32, 16×16, and 8×32 blocks may be acquirable from each block.

For the left block (3-1-1), the 16×32 and 16×16 blocks may be excluded from the candidate group for the same reason as that of the upper left block (2-1) of the second process, and only the 8×32 block may be a candidate. Here, conventionally, the split information includes split presence information and split direction information in the binary tree-based split, but two vertical splits are unconditionally performed. Thus, the split information may be implicitly processed. The 8×32 block acquired through the above-described process may be a block including only the actual image data.

The right block (3-1-2) includes only a padded region. Thus, an additional split is meaningless, and only the 16×32 block may be a candidate. Accordingly, since only one candidate is present, the split information may be implicitly processed.

For the left block (3-2-1), the split information may be implicitly processed through the same process as that of the left block (3-1-1), and the acquired 8×32 block may be a block including only the actual image data.

The right block (3-2-2) includes only a padded region. Thus, an additional split is meaningless, and only the 16×32 block may be a candidate. Accordingly, since only one candidate is present, the split information may be implicitly processed.

A fourth process is to acquire candidates by splitting a left block (4-1-1) and a right block (4-1-2), which have a size of 8×32 and which is acquired from the left block (3-1-1) and splitting a left block (4-2-1) and a right block (4-2-2) which have a size of 8×32 and is acquired from the left block (3-2-1). Here, the split depth may increase from 2 to 3, and 8×32, 8×16, and 4×32 blocks may be acquirable from each block. However, for the left block (4-1-1) and the left block (4-2-1), one of the 8×32, 8×8, and 4×32 blocks may be determined as an optimal split form because a block including only actual image data is acquired. Also, for the right block (4-1-2) and the right block (4-2-2), only the 8×32 block may be a candidate because only a padded region is included and thus an additional split is meaningless. Here, for the left block (4-1-1) and the left block (4-2-1), the split information may be explicitly processed according to the determination of the optimal split form. For the right block (4-1-2) and the right block (4-2-2), the split information may be implicitly processed because only one candidate is present.

The split information generated during the above first to fourth processes may be expressed as (8×32): 1-0-1-1-1-0-0-0-0-0-1-1-1-0-0-0-0 when the 8×32 block is determined as the optimal split form, (8×16): 1-0-1-1-1-1-0-0-0-0-0-1-1-1-0-0-0-0 when the 8×16 block is determined as the optimal split form, and (4×32): 1-0-1-1-1-1-1-0-0-0-0-1-1-1-0-0-0-0 when the 4×32 block is determined as the optimal split form. Here, the split information may be information regarding the first process, the upper left block (2-1) of the second process, the left block (3-1-1) of the third process, the left block (4-1-1) of the fourth process, the right block (4-1-2) of the fourth process, the right block (3-1-2) of the third process, the upper right block (2-2) of the second process, the lower left block (2-3) of the second process, the left block (3-2-1) of the third process, the left block (4-2-1) of the fourth process, the right block (4-2-2) of the fourth process, the right block (3-2-2) of the third process, and the lower right block (2-4) of the second process in sequence.

In detail, the split information may include one syntax element indicating split presence in the first process, two syntax elements indicating split presence and a split direction in the upper left block (2-1) of the second process, two syntax elements indicating split presence and a split direction in the left block (3-1-1) of the third process, one syntax element indicating split presence in the left block (4-1-1) of the fourth process, one syntax element indicating split presence in the left block (4-1-2) of the fourth process, one syntax element indicating split presence in the right block (3-1-2) of the third process, one syntax element indicating split presence in the upper right block (2-2) of the second process, two syntax elements indicating split presence and a split direction in the left block (3-2-1) of the third process, one syntax element indicating split presence in the left block (4-2-1) of the fourth process, one syntax element indicating split presence in the left block (4-2-2) of the fourth process, one syntax element indicating split presence in the right block (3-2-2) of the third process, and one syntax element indicating split presence in the lower right block (2-4) of the second process. When the syntax element regarding the presence of the split is 0, a split is not performed. When the syntax element regarding the presence of the split is 1, a split is performed. When the syntax element regarding the split direction is 0, the split direction may indicate a horizontal direction. When the syntax element regarding the split direction is 1, the split direction may indicate a vertical direction.

However, among the split information generated during the above first to fourth processes, the left blocks (4-1-1 and 4-2-1) of the fourth process may be explicitly processed, and the other blocks may be implicitly processed. Accordingly, when adaptive encoding/decoding data is processed on the basis of the actual image data, the split information may be expressed as (8×32): 0-0 when the 8×32 block is determined as the optimal split form, (8×16): 1-0-0 when the 8×16 block is determined as the optimal split form, and (4×32): 1-1-1 when the 4×32 block is determined as the optimal split form.

In other words, by using the split information that is generated in the left blocks (4-1-1 and 4-2-1) of the fourth process and explicitly processed, other than the split information that is implicitly processed, the optimal split form may be checked in the basic encoding block.

A case in which the adaptive image data processing method is differently applied will be described below.

4-1. Adaptive Image Data Processing Method 1. According to a Plurality of Split Methods FIGS. 17A to 17F show a first example diagram illustrating an adaptive image data processing method using a plurality of split methods according to an embodiment of the present invention.

The quad tree-based split and the binary tree-based split will be described again. The quad tree-based split may refer to a tree-based split with non-directionality and a split in which a plurality of acquired sub-blocks do not have specific directionality, and the binary tree-based split may refer to a tree-based split with directionality and a split in which a plurality of acquired sub-blocks have specific directionality such as a horizontal or vertical direction. Accordingly, for the binary tree, information regarding the split direction may be additionally generated for the split information.

Splits based on multiple trees may refer to a scheme in which both of the quad tree-based split and the binary tree-based split are supported. However, splits based on other trees may be supported, and thus the present invention is not limited thereto.

Here, the splits based on multiple trees may be supported for a 64×64 block. In split settings for the quad tree, the maximum block may have the same size, which is 64×64, as the basic encoding block and the minimum block may have a size of 16×16. In split settings for the binary tree, the maximum block may have a size of 32×32, the minimum block may have a side length of 4, and the maximum split depth may be 3. Also, a priority may be present for each tree-based split. The quad tree-based split may have a higher priority when the quad tree-based split and the binary tree-based split overlap with each other, but the present invention is not limited thereto.

Figure 17A:
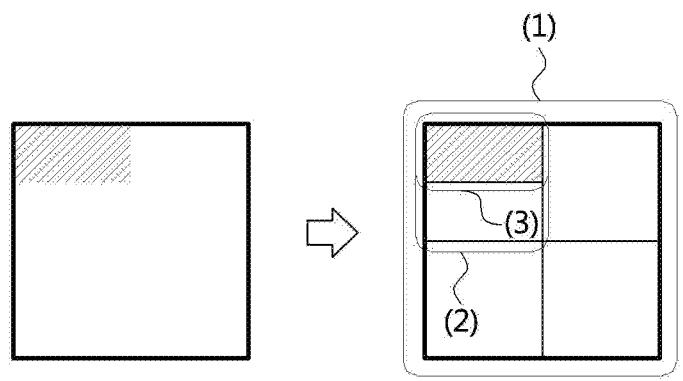

Referring to FIG. 17A, actual image data in a block may be a hatched region (with a size of 32×16). First, the quad tree-based split may be performed on a block (1), and thus four 32×32 blocks may be acquired. Also, the binary tree-based split may be performed on an upper left block (2), which is one of the four 32×32 blocks, and thus two 32×16 blocks may be acquired. Here, an upper block (3), which is one of the two 32×16 blocks, may include only actual image data, and the split information may be implicitly processed as described above. In other words, the split information may be adaptively processed.

Figure 17B:
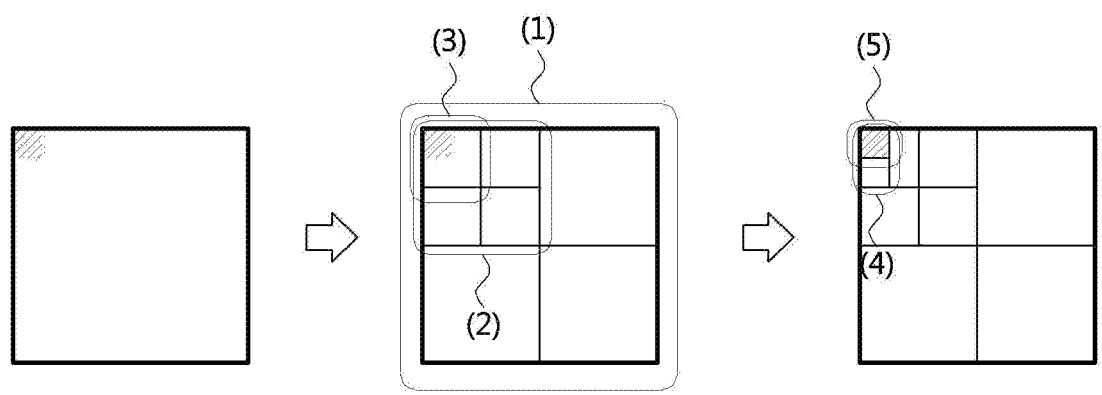

Referring to FIG. 17B, actual image data in a block may be a hatched region (with a size of 8×8). First, the quad tree-based split may be performed on a block (1), and thus four 32×32 blocks may be acquired. Also, the quad tree-based split may be performed on an upper left block (2), which is one of the four 32×32 blocks, and thus four 16×16 blocks may be acquired. The binary tree-based split may be vertically performed on an upper left block (3), which is one of the four 16×16 blocks, and thus two 8×16 blocks may be acquired. Also, the binary tree-based split may be horizontally performed on a left block (4), which is one of the two 8×16 blocks, and thus two 8×8 blocks may be acquired. Here, an upper block (5), which is one of the two 8×8 blocks, may include only actual image data, and the split information may be implicitly processed as described above. In other words, the split information may be adaptively processed.

Figure 17C:
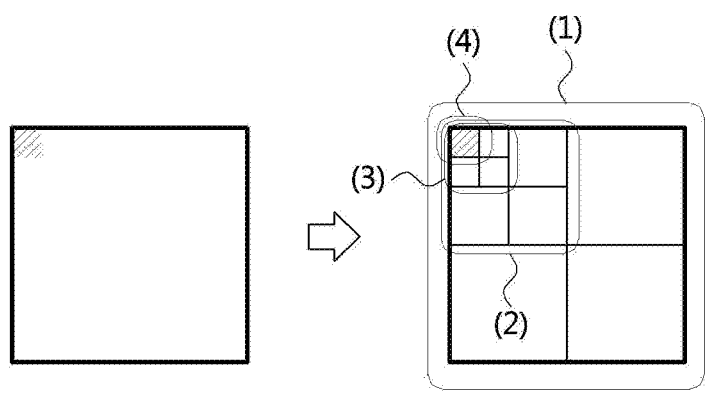

Referring to FIG. 17C, actual image data in a block may be a hatched region (with a size of 8×8), as shown in FIG. 17B. First, the quad tree-based split may be performed on a block (1), and thus four 32×32 blocks may be acquired. Also, the quad tree-based split may be performed on an upper left block (2), which is one of the four 32×32 blocks, and thus four 16×16 blocks may be acquired. The quad tree-based split may be performed on an upper left block (3), which is one of the four 16×16 blocks, and thus four 8×8 blocks may be acquired. Here, an upper left block (4), which is one of the four 8×8 blocks, may include only actual image data, and the split information may be implicitly processed as described above. In other words, the split information may be adaptively processed.

Referring to FIGS. 17B and 17C, the two blocks may have the same actual image data region. However, in order to acquire the block (5), two binary tree splits may be performed on the block (3) in FIG. 17B, and one quad tree split may be performed on the block (3) in FIG. 17C. Accordingly, the case of FIG. 17C may be more efficient considering the number of splits.

However, since the minimum block of the quad tree-based split has a size of 16×16, the last quad tree-based split in FIG. 14c may be restricted. In other words, the quad tree-based split cannot be performed on a corresponding block, and only the binary tree-based split may be performed.

In order to solve such a problem, block split settings for a basic encoding block belonging to a boundary of the picture may be exceptionally set to be different from block split settings for a basic encoding block inside the picture. For example, the quad tree-based split may be allowed for a basic encoding block located on a lower right boundary of the picture when horizontal and vertical lengths of the region including the actual image data do not exceed ½ of horizontal and vertical lengths of the block before the split.

According to the above-described exceptional block split settings, in the block shown in FIG. 17C, the region including the actual image data has a size of 8×8 and the block before the split has a size of 16×16. In this case, the size of the region including the actual image data does not exceed ½ of the size of the block before the split, and thus the quad tree-based split may be third performed. In other words, FIG. 17C may show a case in which the size of the minimum block of the quad tree is changed to 8×8 in some block split settings.

Referring to FIG. 17D, actual image data in a block may be a hatched region (with a size of 48×8). First, the quad tree-based split may be performed on a block (1), and thus four 32×32 blocks may be acquired. Here, since an upper left block (2-1) and an upper right block (2-2), each of which is one of the four 32×32 blocks, include actual image data, the upper left bock (2-1) and the upper right block (2-2) may be additionally and individually split.

Specifically, with respect to the additional splits of the two blocks, the binary tree-based split may be horizontally performed on the upper left block (2-1), and thus two 32×16 blocks may be acquired. The binary tree-based split may be horizontally performed on an upper block (3-1), which is one of the two 32×16 blocks, and thus four 32×8 blocks may be acquired. Here, an upper block (4-1), which is one of the 32×8 blocks, may include only actual image data.

The binary tree-based split may be horizontally performed on the upper right block (2-2), and thus two 32×16 blocks may be acquired. The binary tree-based split may be vertically performed on an upper block (3-2), which is one of the two 32×16 blocks, and thus two 16×16 blocks may be acquired. Also, the binary tree-based split may be horizontally performed on a left block (4), which is one of the two 16×16 blocks, and thus two 16×8 blocks may be acquired. Here, an upper block (5), which is one of the 16×8 blocks, may include only actual image data. In other words, the number of splits of the block shown in FIG. 17D may increase in order to acquire a block including only actual image data, which may cause an increase in complexity.

Figure 17E:
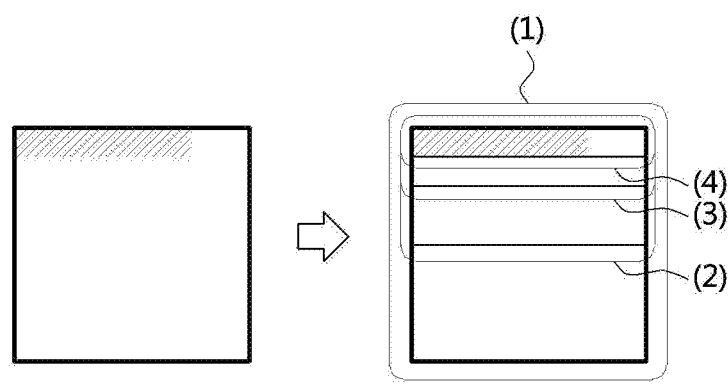

Referring to FIG. 17E, actual image data in a block may be a hatched region (with a size of 48×8), as shown in FIG. 17D. The binary tree-based split may be horizontally performed on a block (1), and thus two 64×32 blocks may be acquired. The binary tree-based split may be horizontally performed on an upper block (2-2), which is one of the two 64×32 blocks, and thus two 64×16 blocks may be acquired. The binary tree-based split may be horizontally performed on an upper block (3), which is one of the two 64×16 blocks, and thus two 64×8 blocks may be acquired. Even when a block including only actual image data is acquired, this process may be efficient because a smaller number of splits are required.

However, due to block split settings, only the quad tree-based split may be supported in an initial block split stage. Thus, in an initial block, the binary tree-based split cannot be performed, and only the quad tree-based split may be allowed.

In order to solve such a problem, block split settings for a basic encoding block belonging to a boundary of the picture may be exceptionally set to be different from block split settings for a basic encoding block inside the picture. For example, the binary tree-to based split may be allowed for a basic encoding block located on a lower right boundary of the picture when horizontal and vertical lengths of the region including the actual image data exceed ½ of horizontal and vertical lengths of the block before the split. Here, the horizontal binary tree-based split may be allowed when the horizontal length exceeds ½, and the vertical binary tree-based split may be allowed when the vertical length exceeds ½. However, the above-described split settings may be applied in common to a tree-based split requiring a direction, such as a ternary tree and an asymmetric binary tree, and thus the present invention is not limited thereto.

According to the above-described exceptional block split settings, in the block shown in FIG. 17E, the region including the actual image data has a size of 48×8 and the block before the split has a size of 64×64. In this case, the size of the region including the actual image data exceeds ½ of the size of the block before the split, and thus the binary tree-based split may be performed. In other words, FIG. 17E may show a case in which the size of the maximum block of the binary tree is changed to 64×64 in some block split settings.

Here, when the horizontal and vertical lengths of the region including the actual image data exceed ½ of the horizontal and vertical lengths of the block before the split, the quad tree-based split may require a smaller number of splits than the binary tree-based split.

The above-described block split settings may allow the quad tree-based split when both of the horizontal and vertical lengths of the region including the actual image data on the upper right boundary of the picture exceed ½ of the horizontal and vertical lengths of the block before the split and when both of the horizontal and vertical lengths of the region are less than or equal to ½ of the horizontal and vertical lengths of the block before the split and also may allow the horizontal or vertical binary tree-based split when only one of the horizontal and vertical lengths of the region exceeds ½ of a corresponding one of the horizontal and vertical lengths of the block before the split. When the above-described block split settings do not allow the split, exceptional processing of the corresponding block settings (a change in some of the split settings) may be possible. Accordingly, a flexible block split may be possible depending on the changed split settings.

The block split settings may allow the following splits on boundaries other than some boundaries. The block split settings may allow the horizontal binary tree-based split regardless of the vertical length of the region including the actual image data on the lower boundary of the picture and may allow the vertical binary tree-based split regardless of the horizontal length of the region including the actual image data on the right boundary of the picture.

In other words, the quad tree-based or binary tree-based split may be possible on the lower right boundary of the picture. Also, on the right boundary and the lower boundary of the picture, the binary tree-based split may be possible in a split direction parallel to the boundaries, and the quad tree-based split may also be possible. However, the binary tree-based split may be impossible in a split direction perpendicular to the boundaries. The description of the present invention assumes that the block before the split includes a padded image in addition to actual image data. Accordingly, the description cannot be applied when the block before the split includes only actual image data.

When the maximum block size of the binary tree-based split is 32×32, blocks acquirable in accordance with minimum block size settings (a side length of 4 and a maximum split depth of 3) may have sizes of 32×32, 32×16, 16×32, 32×8, 8×32, 16×16, 32×4, 4×32, 16×8, and 8×16. However, as shown in FIG. 17E, when the maximum block size of the binary tree-based split is changed from 32×32 to 64×64, the acquirable blocks may have sizes of 64×64, 64×32, 32×64, 64×16, 16×64, 32×32, 64×8, 8×64, 32×16, and 16×32. Accordingly, some of the acquirable blocks in the existing block split settings cannot be acquired from the changed block split settings.

Here, different block split settings such as the side length of the minimum block or the maximum split depth, in addition to the size of the maximum block, may be changed. Thus, a block split may be performed on a basic encoding block on a boundary of the picture.

Figure 17F:
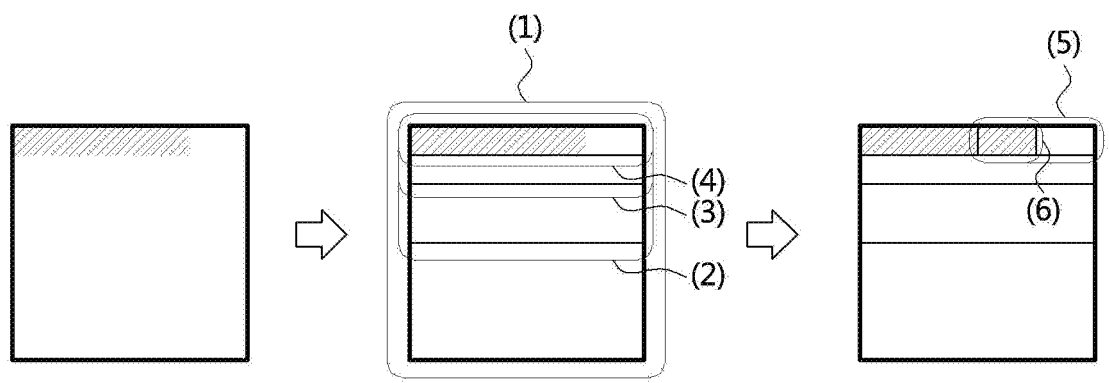

Referring to FIG. 17F, actual image data in a block may be a hatched region (with a size of 48×8), as shown in FIGS. 17D and 17E. According to the above-described block split settings, the binary tree-based split may be horizontally performed on a block (1), and thus two 64×32 blocks may be acquired. The binary tree-based split may be horizontally performed on an upper block (2-2), which is one of the two 64×32 blocks, and thus two 64×16 blocks may be acquired. The binary tree-based split may be horizontally performed on an upper block (3), which is one of the two 64×16 blocks, and thus two 64×8 blocks may be acquired. Also, the binary tree-based split may be vertically performed on an upper block (4), which is one of the two 64×8 blocks, and thus two 32×8 blocks may be acquired. A left block, which is one of the two 32×8 blocks, may include only actual image data, and the binary tree-based split may be performed on a right block (5), which is the other of the two 32×8 blocks, and thus two 16×8 blocks may be acquired. A left block (6), which is one of the two 16×8 blocks, may include only actual image data.

However, even when an exceptional case, such as the above-described block split settings, is considered, a split of less than the minimum size for encoding residual coefficients cannot be allowed. For example, when the minimum size for encoding residual coefficients is 4×4, a block which is smaller than a 4×4 block cannot be allowed. However, the block may be allowed when horizontal and vertical lengths are greater than or equal to the horizontal and vertical lengths of the minimum size for encoding residual coefficients or when one of the horizontal and vertical lengths is shorter but a product between the horizontal length and the vertical length is greater than or equal to a product between the horizontal length and the vertical length of the minimum size for encoding residual coefficients because the other of the horizontal and vertical lengths is sufficiently long. Here, a flag for checking whether a residual coefficient is present (e.g., a coded block flag) or the like may be supported for the block.

Figure 18A:
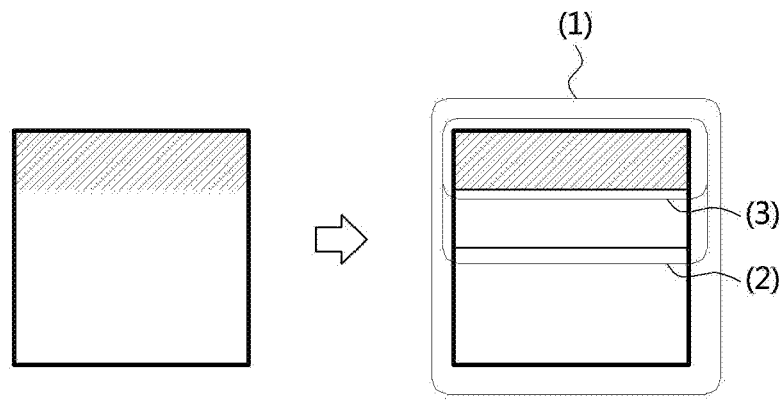
FIGS. 18A to 18C show a second example diagram illustrating an adaptive image data processing method using a plurality of split methods according to an embodiment of the present invention.
Figure 18B:
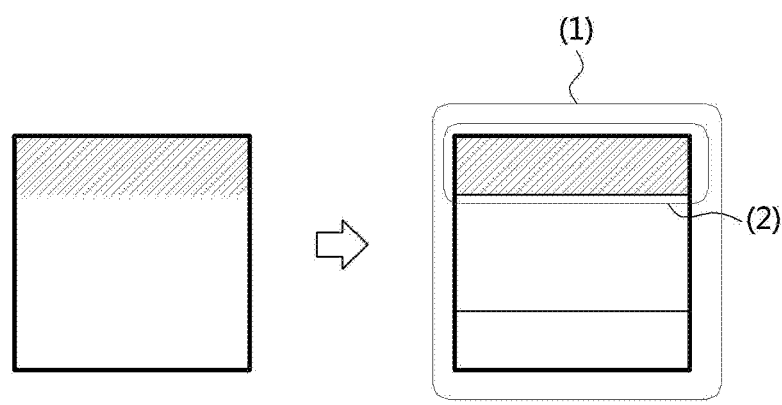
Figure 18C:
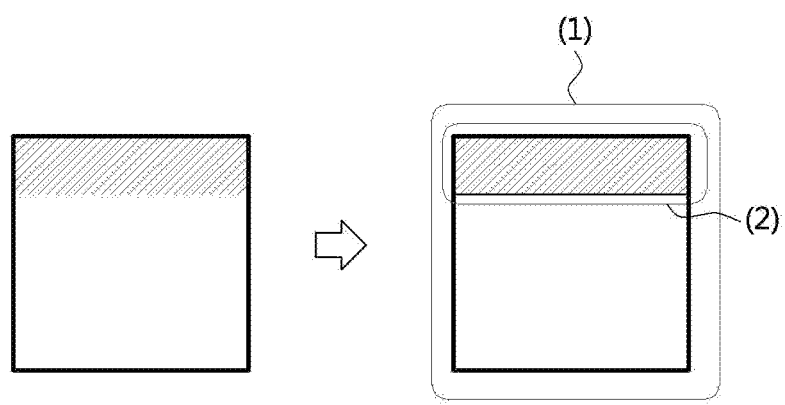

4-2. Adaptive Image Data Processing Method 2. According to a Plurality of Split Methods FIGS. 18A to 18C show a second example diagram illustrating an adaptive image data processing method using a plurality of split methods according to an embodiment of the present invention.

Here, it is assumed that splits based on multiple trees such as a binary tree and a ternary tree may be supported for a block, the maximum block has a size of 64×64, the minimum block has a side length of 4, and the maximum split depth is 4. A priority is not present for each tree-based split, and selection information regarding which tree-based split is to be selected may be generated.

Accordingly, split presence information, tree selection information, and split direction information may be sequentially generated as the split information. Here, the split is not performed when the split presence information is 0 and is performed when the split presence information is 1. When the tree selection information is 0, the tree selection information may indicate the binary tree-based split. When the tree selection information is 1, the tree selection information may indicate the ternary tree-based split. Also, when the split direction information is 0, the split direction information may indicate a horizontal direction. When the split direction information is 1, the split direction information may indicate a vertical direction.

Also, it is assumed that the exceptional block split settings described in the above-described adaptive image data processing method 1 according to the plurality of split methods may be applied to the adaptive image data processing method 2.

Referring to FIGS. 18A to 18C, a basic encoding block may have a size of 64×64, and actual image data may be a hatched region (with a size of 64×16). Here, since the binary tree-based split and the ternary tree-based split may be performed on the block, blocks with sizes of 64×64, 64×32, 32×64, $64 \times {}^{16}\!\!/_{64} \times {}^{32}\!\!/_{64} \times 16$, and $16 \times {}^{64}\!\!/_{32} \times {}^{64}\!\!/_{16} \times 64$ are acquirable through one split.

Referring to FIG. 18A, the binary tree-based split may be horizontally performed on a block (1), and thus two 64×32 blocks may be acquired. Here, the split depth may increase from 0 to 1, and the split information may be generated as 1-0-0 or may be implicitly processed. The binary tree-based split may be horizontally performed on an upper block (2), which is one of the two 64×32 blocks, and thus two 64×16 blocks may be acquired. Here, the split depth may increase from 1 to 2, and the split information may be generated as 1-0-0 or may be implicitly processed. An upper block (3), which is one of the two 64×16 blocks, includes only actual image data, and thus an optimal split form may be determined through an additional split. However, it is assumed that this region is not additionally split as shown in FIGS. 18B and 18c as well as this example.

The split information generated during the above split process may be expressed as (64×16): 1-0-0-1-0-0-0-0-0. However, split information corresponding to the upper block (3), which is one of the two 64×16 blocks and includes actual image data, may be explicitly processed, and split information corresponding to the other blocks, which include only a padded region, may be implicitly processed. Accordingly, when adaptive encoding/decoding data is processed on the basis of the actual image data, the split information may be 0 depending on an explicitly processing process. Here, 0 may denote split presence information of split information that is third generated.

Referring to FIG. 18B, the ternary tree-based split may be horizontally performed on a block (1), and thus two 64×16 blocks and one 64×32 block may be acquired. Here, the split depth may increase from 0 to 1, and the split information may be generated as 1-1-0 or may be implicitly processed. Since an upper block (2), which is one of the two 64×16 blocks, may include only actual image data, an additional split may not be required. Accordingly, an optimal split form may be determined. However, the optimal split form may be determined through the additional split.

The split information generated during the above split process may be expressed as (64×16): 1-1-0-0-0-0. However, split information corresponding to the upper block (2), which is one of the two 64×16 blocks and includes actual image data, may be explicitly processed, and split information corresponding to the other blocks, which include only a padded region, may be implicitly processed. Accordingly, when adaptive encoding/decoding data is processed on the basis of the actual image data, the split information may be 0 depending on an explicitly processing process. Here, 0 may denote split presence information of split information that is second generated.

In FIGS. 18A and 18B, the split information may be the same, that is, 0. However, there may be a difference in the step of reaching the block including only the actual image data even though the data is implicitly processed as the number of splits increases in the encoding/decoding processing process. Accordingly, when there are one or more methods of reaching the block including only the actual image data from an initial block or a basic encoding block, a method using a smaller number of splits may be set to be implicitly determined. In other words, when both of the cases of FIGS. 18A and 18B are possible, a method using the ternary tree-based split shown in FIG. 18B may be set to be implicitly determined because the case of FIG. 18B requires a smaller number of splits.

According to an embodiment, when the horizontal length of the region including the actual image data is equal to ¼ or ¾ of the horizontal length of the block before the split on the right boundary of the picture, the ternary tree-based split may be vertically performed. When the horizontal length of the region is not equal to ¼ or ¾ of the horizontal length of the horizontal length of the block before the split, the binary tree-based split may be vertically performed.

Also, when the vertical length of the region including the actual image data is equal to ¼ or ¾ of the vertical length of the block before the split on a lower boundary of the picture, the ternary tree-based split may be horizontally performed. When the vertical length of the region is not equal to ¼ or ¾ of the horizontal length of the vertical length of the block before the split, the binary tree-based split may be horizontally performed.

The above description is associated with some boundaries, and thus a split on the other boundaries may be as follows.

Also, when at least one of the horizontal and vertical lengths of the region including the actual image data is equal to ¼ or ¾ of a corresponding one of the horizontal and vertical lengths of the block before the split on a lower right boundary of the picture, the ternary tree-based split may be horizontally or vertically performed. When the horizontal and vertical lengths of the region are not equal to ¼ or ¾ of the horizontal and vertical lengths of the block before the split, the binary tree-based split may be horizontally or vertically performed.

Here, when any one of the horizontal and vertical lengths of the region including the actual image data does not exceed ½, the binary tree-based split may be performed in a direction perpendicular to the corresponding length. When none of the horizontal and vertical lengths of the region exceed ½, the binary tree-based split may be horizontally or vertically performed. For example, when only the horizontal length of the region including the actual image data does not exceed ½, the binary tree-based split may be vertically performed.

Also, it is determined whether the horizontal length of the region including the actual image data is equal to ¼ or ¾ of the horizontal length of the block before the split or whether the vertical length of the region including the actual image data is equal to ¼ or ¾ of the vertical length of the block before the split. When any one is satisfied, the ternary tree-based split may be performed. Otherwise, the binary tree-based split may be performed.

In summary, the binary tree-based split or the ternary tree-based split may be possible on the lower right boundary of the picture. Also, on the lower boundary and the right boundary of the picture, the binary tree-based split or the ternary tree-based split may be possible in a split direction parallel to the boundaries and is not possible in a split direction perpendicular to the boundaries.

The above-described embodiments of the present invention may assume that the block before the split includes both of actual image data and a padded image, and thus cannot be applied to a case in which only the actual image data is included. For convenience of description, the ternary tree-based split has been described as a split into three parts in the above-described ratio (1:2:1), but another ratio may also be possible depending on encoding settings.

Another embodiment in which a plurality of different split methods are applied will be described with reference to FIG. 18C, as follows.

Here, it is assumed that splits based on multiple trees such as a symmetric binary tree and an asymmetric binary tree may be supported for a block, the maximum block has a size of 64×64, the minimum block has a side length of 4, and the maximum split depth is 4. Also, a priority is not present for each tree-based split, and selection information regarding which tree-based split is to be selected may be generated. Here, for the asymmetric binary tree, split ratio information as well as split direction information may be additionally required, and a predetermined split ratio, such as 1:3 or 3:1, may be restricted. However, other additional split ratios may be possible.

Accordingly, split presence information, split direction information, and tree selection information may be generated as the split information. When the tree selection information indicates an asymmetric binary tree, split ratio information may be further generated. Also, the split information may be generated in the listed order. Here, the split is not performed when the split presence information is 0 and is performed when the split presence information is 1. Also, when the split direction information is 0, the split direction information may indicate a horizontal direction. When the split direction information is 1, the split direction information may indicate a vertical direction. When the tree selection information is 0, the tree selection information may indicate the symmetric binary tree-based split. When the tree selection information is 1, the tree selection information may indicate the asymmetric binary tree-based split. Also, when the split ratio information according to the asymmetric binary tree-based split is 0, the split ratio information may indicate a ratio having a wide upper or left side. When the split ratio information is 1, the split ratio information may indicate a ratio having a wide lower or right side.

A basic encoding block may have a size of 64×64, and actual image data may be a hatched region (with a size of 64×16). Here, since the symmetric binary tree-based split and the asymmetric binary tree-based split may be performed on the block, blocks with sizes of 64×64, 64×32, 32×64, 64×$^{48}$⁄$_{64}$×16, 64×$^{16}$⁄$_{64}$×48, 48×$^{64}$⁄$_{16}$×64, and 16×$^{64}$⁄$_{48}$×64 are acquirable.

Referring to FIG. 18C, the asymmetric binary tree-based split may be horizontally performed on a block (1), and thus a 64×16 block and a 64×48 block may be acquired. Here, the split depth may increase from 0 to 1, and the split information may be generated as 1-0-1-1. However, the split information may be implicitly processed because only one candidate may be supported. Also, since the 64×16 block (2) may include only actual image data, an additional split may not be required. Accordingly, an optimal split form may be determined. However, when an additional split is performed, the optimal split form may be determined through the additional split according to the block split settings.

The split information generated during the above split process may be expressed as (64×16): 1-0-1-1-0-0. However, split information corresponding to the 64×16 block (2), which includes actual image data, may be explicitly processed, and split information corresponding to the other blocks, which include only a padded region, may be implicitly processed. Accordingly, when adaptive encoding/decoding data is processed on the basis of the actual image data, the split information may be 0 depending on an explicitly processing process. Here, 0 may denote split presence information of the 64×16 block (2).

Also, all split information generated during a process of acquiring a 64×16 block including only the actual image data from an initial block or a basic encoding block may be 0 in FIGS. 18A and 18C. However, 0 may denote different pieces of information.

Also, since both of the cases of FIGS. 18A and 18C may be used to reach the block including only the actual image data from the initial block or the basic encoding block, a method using a smaller number of splits may be implicitly determined. In other words, the asymmetric binary tree-based split method having a smaller number of splits according to FIG. 18C may be determined.

According to an embodiment, the asymmetric binary tree-based split may be vertically performed when the horizontal length of the region including the actual image data is equal to $1/4$ or $3/4$ of the horizontal length of the block before the split on the right boundary of the picture, the symmetric binary tree-based split may be vertically performed when the horizontal length of the region is equal to $1/2$, and the symmetric or asymmetric binary tree-based split may be vertically performed when the horizontal length of the region is equal to $1/4$, $1/2$, or $3/4$.

More specifically, with respect to the case in which the horizontal length of the region is not equal to $1/4$, $1/2$, or $3/4$, a split based on an asymmetric binary tree having a wide right side may be vertically performed when the horizontal length of the region including the actual image data is less than or equal to $1/4$ of the horizontal length of the block before the split, and the symmetric binary tree-based split may be vertically performed when the horizontal length of the region is greater than $1/4$ and less than or equal to $1/2$. Also, a split based on an asymmetric binary tree having a wide left side may be vertically performed when the horizontal length of the region is greater than $1/2$ and less than or equal to $3/4$, and the symmetric binary tree-based split may be performed when the horizontal length of the region is greater than $3/4$.

Also, the asymmetric binary tree-based split may be horizontally performed when the vertical length of the region including the actual image data is equal to $1/4$ or $3/4$ of the vertical length of the block before the split on the lower boundary of the picture, the symmetric binary tree-based split may be horizontally performed when the vertical length of the region is equal to $1/2$, and the symmetric or asymmetric binary tree-based split may be horizontally performed when the vertical length of the region is not equal to $1/4$, $1/2$, or $3/4$.

More specifically, with respect to the case in which the horizontal length of the region is not equal to $1/4$, $1/2$, or $3/4$, a split based on an asymmetric binary tree having a wide lower side may be horizontally performed when the vertical length of the region including the actual image data is less than or equal to $1/4$ of the vertical length of the block before the split, and the symmetric binary tree-based split may be horizontally performed when the horizontal length of the region is greater than $1/4$ and less than or equal to $1/2$. Also, a split based on an asymmetric binary tree having a wide upper side may be horizontally performed when the vertical length of the region is greater than $1/2$ and less than or equal to $3/4$, and the symmetric binary tree-based split may be performed when the vertical length of the region is greater than $3/4$.

The above description is associated with some boundaries, and thus a split on the other boundaries may be as follows.

The asymmetric binary tree-based split may be horizontally or vertically performed when at least one of the horizontal and vertical lengths of the region including the actual image data is equal to $1/4$ or $3/4$ of a corresponding one of the horizontal and vertical lengths of the block before the split on the lower right boundary of the picture, the symmetric binary tree-based split may be horizontally or vertically performed when at least one of the horizontal and vertical lengths of the region is equal to $1/2$, and the symmetric or asymmetric binary tree-based split may be horizontally or vertically performed when the horizontal and vertical lengths of the region are not equal to $1/4$, $1/2$, or $3/4$. A detailed description of the case in which the horizontal and vertical lengths of the region are not equal to $1/4$, $1/2$, or $3/4$ may be derived from the right side or the right boundary and thus will be omitted.

In other words, the symmetric binary tree-based split or the asymmetric binary tree-based split may be possible on the lower right boundary of the picture. Also, on the lower boundary and the right boundary of the picture, the symmetric binary tree-based split or the asymmetric binary tree-based split may be possible in a split direction parallel to the boundaries and may not be possible in a split direction perpendicular to the boundaries.

The above-described embodiments of the present invention may assume that the block before the split includes both of actual image data and a padded image, and thus cannot be applied to a case in which only the actual image data is included. Also, for convenience of description, the asymmetric binary tree-based split has been described as split into two parts in the above-described ratio (1:3 or 3:1), but another ratio may also be possible depending on encoding settings.

4-3. Adaptive Image Data Processing Method 3. According to a Plurality of Split Methods Here, splits based on multiple trees such as a quad tree, a binary tree, and a ternary tree may be supported for a block, and the adaptive image data processing method 3 may be the same as the adaptive image data processing methods 1 and 2 with respect to the other aspects. Also, it is assumed that the exceptional block split settings described in the above-described adaptive image data processing methods 1 and 2 according to the plurality of split methods may be applied to the adaptive image data processing method 3.

According to an embodiment, when at least one of the horizontal and vertical lengths of the region including the actual image data is equal to $1/4$ or $3/4$ of a corresponding one of the horizontal and vertical lengths of the block before the split on the lower right boundary of the picture, the ternary tree-based split may be horizontally or vertically performed. Here, when the horizontal and vertical lengths of the region are not equal to $1/4$ or $3/4$, the horizontal and vertical lengths of the region including the actual image data are compared to the horizontal and vertical lengths of the block before the split. When both of the horizontal and vertical lengths of the region exceed or do not exceed $1/2$, the quad tree-based split may be performed. When only one of the horizontal and vertical lengths of the region exceeds $1/2$, the binary tree-based split may be horizontally or vertically performed.

Also, when the horizontal and vertical lengths of the region including the actual image data are equal to ¼ or ¾ of the vertical length of the block before the split on the lower boundary of the picture, the ternary tree-based split may be horizontally performed. When the horizontal and vertical lengths of the region are not equal to ¼ or ¾, the binary tree-based split may be horizontally performed.

Also, when the horizontal and vertical lengths of the region including the actual image data are equal to ¼ or ¾ of the horizontal length of the block before the split on the right boundary of the picture, the ternary tree-based split may be vertically performed. When the horizontal and vertical lengths of the region are not equal to ¼ or ¾, the binary tree-based split may be vertically performed.

In other words, the quad tree-based split, binary tree-based split, and ternary tree-based split on the lower right boundary of the picture may be possible in a horizontal or vertical direction, and the binary tree-based split and the ternary tree-based split on the lower boundary and the right boundary of the picture may be possible in a split direction parallel to the boundaries. In some cases, however, on the lower boundary and the right boundary of the picture, the quad tree-based split may be possible, but the binary tree-based split and the ternary tree-based split may be impossible in a split direction perpendicular to the boundaries.

Various embodiments (4-1, 4-2, and 4-3) of the adaptive image data process method according to the plurality of split methods have been described, but may be changed according to block split settings. Thus, the present invention is not limited thereto. In other words, the block may have acquirable blocks determined according to the block split settings, and thus it is possible to adaptively process block split information on a boundary of a picture.

Figure 19:
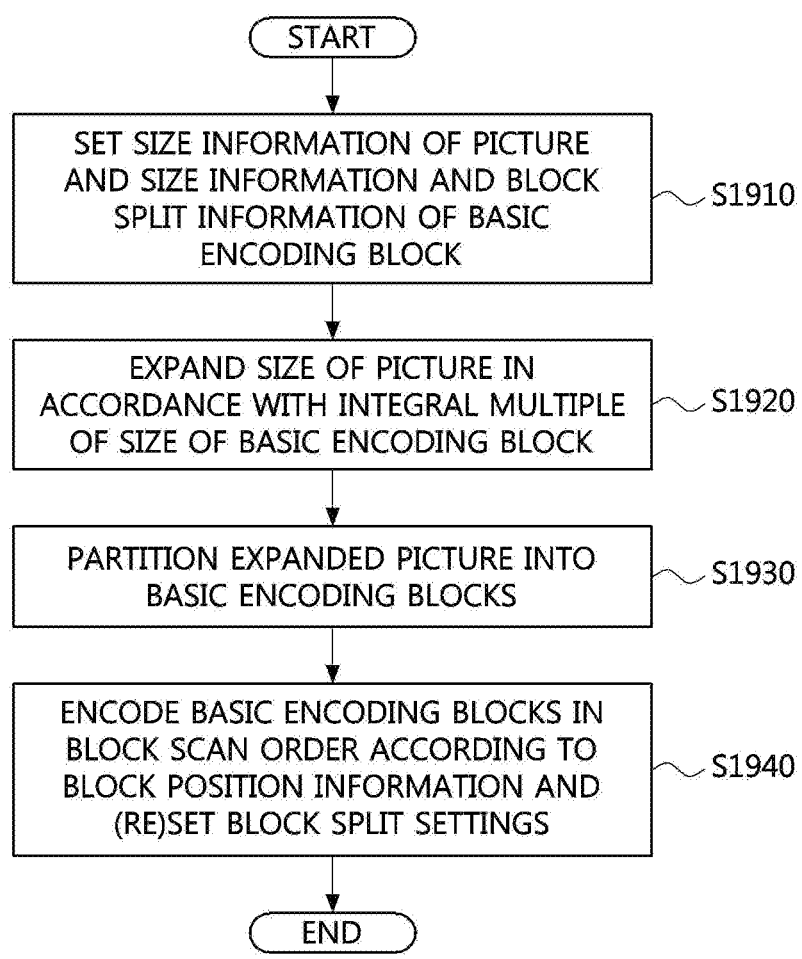
FIG. 19 is a flowchart showing a method of encoding an image through adaptive image data processing according to an embodiment of the present invention.

FIG. 19 is a flowchart showing a method of encoding an image through adaptive image data processing according to an embodiment of the present invention.

Referring to FIG. 19, an image encoding apparatus for adaptively processing image data according to an embodiment of the present invention may set size information of a picture and size information and block split information of a basic encoding block (S1910) and expand the size of the picture such that the size of the picture is an integral multiple of the size of the basic encoding block (S1920). Also, the image encoding apparatus may partition the expanded picture into basic encoding blocks (S1930), encode the basic encoding blocks according to block position information and (re)set block split settings (S1940), and transmit a bitstream corresponding to the encoding to an image decoding apparatus.

Also, the image decoding apparatus according to an embodiment of the present invention may operate corresponding to the above-described image encoding apparatus. In other words, the image decoding apparatus may restore the size information of the picture and the size information and the block split information of the basic encoding block on the basis of the bitstream received from the image encoding apparatus and may expand the size of the picture so that the size of the picture is an integral multiple of the size of the basic encoding block. Also, the image decoding apparatus may partition the expanded picture into basic encoding blocks and may decode the basic encoding blocks according to a block scan order, the block position information, and the (re)set block split settings.

Here, the expansion of the picture may be performed in some directions, such as rightward or downward from the picture, according to an integral multiple of the basic encoding block. The basic encoding block located on a boundary of the picture may be adaptively encoded according to the location of the block and the block split settings. Here, depending on encoding settings, the block split settings may be used with no change or be reset with a partial change.

According to an embodiment, split information of a basic encoding block located inside the picture may be explicitly processed, and information of a basic encoding block located on a boundary of the picture may be explicitly or implicitly processed on the basis of actual image data. Here, when settings such as the size and form of an acquirable block are changed and reset according to a split, the settings may be reflected and then processed.

While the example embodiments of the present invention and their advantages have been described in detail, it should be understood that various changes, substitutions and alterations may be made herein without departing from the scope of the invention.

What is claimed is:

1. An image decoding method, comprising:
   dividing a first coding block to determine a second coding block; and
   decoding the second coding block,
   wherein the first coding block is divided based on one of division types pre-defined in an image decoding apparatus,
   wherein the division types include at least one of a quad-tree division, a binary-tree division, or a ternary-tree division,
   wherein the quad-tree division is representative of a division type of dividing one coding block into four coding blocks, the binary-tree division is representative of a division type of dividing one coding block into two coding blocks, and the ternary-tree division is representative of a division type of dividing one coding block into three coding blocks,
   wherein a division type for the first coding block is determined to be one of the quad-tree division, the binary-tree division, or the ternary-tree division when a shape of the first coding block is square, and the division type for the first coding block is determined to be the binary-tree division or the ternary-tree division when the shape of the first coding block is non-square,
   wherein the binary-tree division and the ternary-tree division are applied only when the quad-tree division is no longer performed,
   wherein the second coding block is determined based on predetermined division information,
   wherein the division information includes at least one of a first flag indicating whether to divide the first coding block, a second flag indicating a division direction, or a third flag indicating the division type,
   wherein the second flag equal to a first value indicates that the first coding block is divided in a horizontal direction, and the second flag equal to a second value indicates that the first coding block is divided in a vertical direction,
   wherein the third flag equal to a first value indicates that the binary-tree division is performed, and the third flag equal to a second value indicates that the ternary-tree division is performed,
   wherein, when the first coding block is located at a boundary of a current picture, only at least one of the quad-tree division or the binary-tree division is allowed,
   wherein the binary-tree division includes a horizontal binary-tree division and a vertical binary-tree division, and wherein, when the boundary of the current picture is a bottom boundary, only the horizontal binary-tree division among the horizontal binary-tree division and the vertical binary-tree division is allowed for the binary-tree division.

2. An image encoding method, comprising:

dividing a first coding block to determine a second coding block; and encoding the second coding block, wherein the first coding block is divided based on one of division types pre-defined in an image encoding apparatus, wherein the division types include at least one of a quad-tree division, a binary-tree division, or a ternary-tree division, wherein the quad-tree division is representative of a division type of dividing one coding block into four coding blocks, the binary-tree division is representative of a division type of dividing one coding block into two coding blocks, and the ternary-tree division is representative of a division type of dividing one coding block into three coding blocks, wherein a division type for the first coding block is determined to be one of the quad-tree division, the binary-tree division, or the ternary-tree division when a shape of the first coding block is square, and the division type for the first coding block is determined to be the binary-tree division or the ternary-tree division when the shape of the first coding block is non-square, wherein the binary-tree division and the ternary-tree division are applied only when the quad-tree division is no longer performed, wherein the second coding block is determined based on predetermined division information, wherein the division information includes at least one of a first flag indicating whether to divide the first coding block, a second flag indicating a division direction, or a third flag indicating the division type, wherein the second flag equal to a first value indicates that the first coding block is divided in a horizontal direction, and the second flag equal to a second value indicates that the first coding block is divided in a vertical direction, wherein the third flag equal to a first value indicates that the binary-tree division is performed, and the third flag equal to a second value indicates that the ternary-tree division is performed, wherein, when the first coding block is located at a boundary of a current picture, only at least one of the quad-tree division or the binary-tree division is allowed, wherein the binary-tree division includes a horizontal binary-tree division and a vertical binary-tree division, and wherein, when the boundary of the current picture is a bottom boundary, only the horizontal binary-tree division among the horizontal binary-tree division and the vertical binary-tree division is allowed for the binary-tree division.

3. A non-transitory computer readable medium having stored thereon instructions that when executed by a processor perform a decoding method, the method comprising:

dividing a first coding block to determine a second coding block; and decoding the second coding block, wherein the first coding block is divided based on one of division types, wherein the division types include at least one of a quad-tree division, a binary-tree division, or a ternary-tree division, wherein the quad-tree division is representative of a division type of dividing one coding block into four coding blocks, the binary-tree division is representative of a division type of dividing one coding block into two coding blocks, and the ternary-tree division is representative of a division type of dividing one coding block into three coding blocks, wherein a division type for the first coding block is determined to be one of the quad-tree division, the binary-tree division, or the ternary-tree division when a shape of the first coding block is square, and the division type for the first coding block is determined to be the binary-tree division or the ternary-tree division when the shape of the first coding block is non-square, wherein the binary-tree division and the ternary-tree division are applied only when the quad-tree division is no longer performed, wherein the second coding block is determined based on predetermined division information, wherein the division information includes at least one of a first flag indicating whether to divide the first coding block, a second flag indicating a division direction, or a third flag indicating the division type, wherein the second flag equal to a first value indicates that the first coding block is divided in a horizontal direction, and the second flag equal to a second value indicates that the first coding block is divided in a vertical direction, wherein the third flag equal to a first value indicates that the binary-tree division is performed, and the third flag equal to a second value indicates that the ternary-tree division is performed, wherein, when the first coding block is located at a boundary of a current picture, only at least one of the quad-tree division or the binary-tree division is allowed, wherein the binary-tree division includes a horizontal binary-tree division and a vertical binary-tree division, and wherein, when the boundary of the current picture is a bottom boundary, only the horizontal binary-tree division among the horizontal binary-tree division and the vertical binary-tree division is allowed for the binary-tree division.

* * * * *